United States Patent [19]

Sudia

[11] Patent Number: 5,659,616
[45] Date of Patent: Aug. 19, 1997

[54] METHOD FOR SECURELY USING DIGITAL SIGNATURES IN A COMMERCIAL CRYPTOGRAPHIC SYSTEM

[75] Inventor: Frank Wells Sudia, New York, N.Y.

[73] Assignee: Certco, LLC, New York, N.Y.

[21] Appl. No.: 682,071

[22] Filed: Jul. 16, 1996

Related U.S. Application Data

[63] Continuation of Ser. No. 277,438, Jul. 19, 1994, abandoned.
[51] Int. Cl.$^6$ .................................................. H04K 1/00
[52] U.S. Cl. ............................. 380/23; 380/25; 380/30
[58] Field of Search ........................... 380/23, 25, 24, 380/4, 3, 49, 29, 30

[56] References Cited

U.S. PATENT DOCUMENTS

| | | | |
|---|---|---|---|
| 4,625,076 | 11/1986 | Okamoto et al. | 380/23 |
| 4,981,370 | 1/1991 | Dziewit et al. | 380/25 |
| 5,005,200 | 4/1991 | Fischer | 380/30 |
| 5,031,214 | 7/1991 | Dziewit et al. | 380/23 |
| 5,157,726 | 10/1992 | Merkle et al. | 380/23 |
| 5,163,091 | 11/1992 | Graziano et al. | 380/25 |
| 5,191,613 | 3/1993 | Graziano et al. | 380/215 |
| 5,214,702 | 5/1993 | Fischer | 380/30 |

OTHER PUBLICATIONS

ANSI X9.30–199x (Working Draft) Public Key Cryptography Using Irreversible Algorithms for the Financial Services Industry: Part 3: Certificate Management for DSA, Jun. 1, 1994, pp. i–86.

Secure Data Network System, Access Control Specification, Access Control Information Specification (ACIS) Addendum 1 (SDN.802/1), Jul. 25, 198 pp. ii–85.

Secure Data Network System, Access Control Specification, SDN.802, Rev. 1.0 Jul. 25, 1989, pp. 1.43.

Secure Data Network System; Access Control Concept Document (Revision 1.3), SDN.801, Jul. 26, 1989, pp. 1–18.

European Computer Manufacturers Association, Standard ECMA–138 Security in Open Systems —Data Elements and Service Definitions, Dec. 1989, pp. i–81.

Addison Fischer, Workflow. 2000–Electronic Document Authorization in Practice, Fischer International Systems Corporation, Copyright 1992, 7 pages.

Richard Ankney, Certificate Management for the Financial Services Industry. Aba/Scitech/Notaization and Nonrepudiation WG. Mtg. of Jul. 1, 1993.

ANSI X9.30 (Working Draft) Public Key Cryptography Using Irreversible Algorithms for the Financial Services Industry: Part 3: Certificate Management for DSA, Mar. 29, 1993, pp. i–71.

ANSI X9.30–199x (Working Draft) Public Key Cryptography Using Irreversible Algorithms for the Financial Services Industry: Part 3: Certificate Management of DSA, Sep. 27, 1993, p. i–87.

Rich Ankney, et al. Enhanced Management Controls Using Attribute Certificates, ASC X9 Project Proposal No. X9F–1–3, Nov. 10, 1993, 13 pages.

(List continued on next page.)

*Primary Examiner*—David C. Cain
*Attorney, Agent, or Firm*—Cushman, Darby & Cushman IP Group of Pillsbury Madison & Sutro LLP

[57] ABSTRACT

A system for securely using digital signatures in a commercial cryptographic system that allows industry-wide security policy and authorization information to be encoded into the signatures and certificates by employing attribute certificates to enforce policy and authorization requirements. In addition to value limits, cosignature requirements and document type restrictions that can be placed on transactions, an organization can enforce with respect to any transaction geographical and temporal controls, age-of-signature limitations, preapproved counterparty limitations and confirm-to requirements by using attribute certificates for the transacting user. Restrictions on distribution of certificates can be set using attribute certificates. Certificates can be used also to ensure key confinement and non-decryption requirements of smartcards in this system.

37 Claims, 15 Drawing Sheets

OTHER PUBLICATIONS

ANSI X9.30–199x (Draft), Executive Summary, Public Key Cryptography Using Irreversibl Algorithms for the Financial Services Industry: Part 3: Certificate Management for DSA Nov. 18, 1993, pp. 1–6.

ANSI X9.xx–19x (Working Draft) Enhanced Management Controls Using Attribute Certificates, Jan. 3, 1994, pp. 1–18.

ANSI X9.30–199X (Working Draft) Public Key Cryptography Using Reversible Algorithms for the Financial Services Industry: Part 3.

PKCS #7: Cryptographic Message Syntax Standard, Version 1.4, Jun. 3, 1991, pp. 1–24.

Recommendation X 500: The Directory–Overview of Concepts, Models and Services, Melbourne, 1988, pp. 1–13.

Robert Jueneman, Limiting The Liability of CAs and Individuals Regarding the Use of Digital Signatures, Jun. 30, 1993, pp. 1–8.

John Linn, Practical Authentication for Distributed Computing, IEEE, 1990, pp. 32–40.

Morrie Gasser et al, An Architecture for Practical Delegation in a Distributed System, IEEE, 1990, pp. 20–30.

Denis Pinkas et al. Sesame: Secure European System for Applications in a Multivendor Environment, Issue 1, Feb. 1993.

J. Linn, Privacy Enhancement for Internet Electronic Mail: Part I, Feb. 1993, pp. 1–42.

S. Kent, Privacy Enhancement for Internet Electronic Mail: Part II, Feb. 1993, pp. 1–32.

X1258 Version 2, ASC X–12 Draft Standard . . . Managing Electronic Data Interchange, pp. 1–40.

Financial Institution Sign–On Authentication for Wholesale Financial Transactions X926, Approved:Feb. 28,1990, pp. 1–25.

Draft ANSI X9 30–199x, Public Key Cryptography Using Irreversible Algorithms for the Financial Services Industry: Part 3, Nov. 18, 1993, pp. 1–6.

PKCS #7: Cryptographic Message Syntax Standard Version 15, Revised Nov. 1, 1993.

Information Technology —Open Systems Interconnection– The Directory: Authentication Framework —Recommendation X 509 ISO/IEC 9594–8 (1993), pp. i–35.

Accredited Standards Committee X9, X9–Financial Services, Public Key Cryptography Using Irreversible Algorithms for the Financial Services Industry: Part 3, Oct. 7, 1995, pp. i–81.

Frank Sudia and Richard Ankney, Commercialization of Digital Signatures, July 20 Boston, pp. 1–16.

Addison M. Fischer, Electronic Document Authorization, National Computer Security Conference, 1992, pp. 1–23.

ECMA —Standard ECMA–138 —Security In Open Systems —Data Elements and Service Definitions, Dec. 1989, pp. i–81.

ECMA —Security in Open Systems A Security Framework, ECMA TR/46, Jul. 1988, pp. i–71.

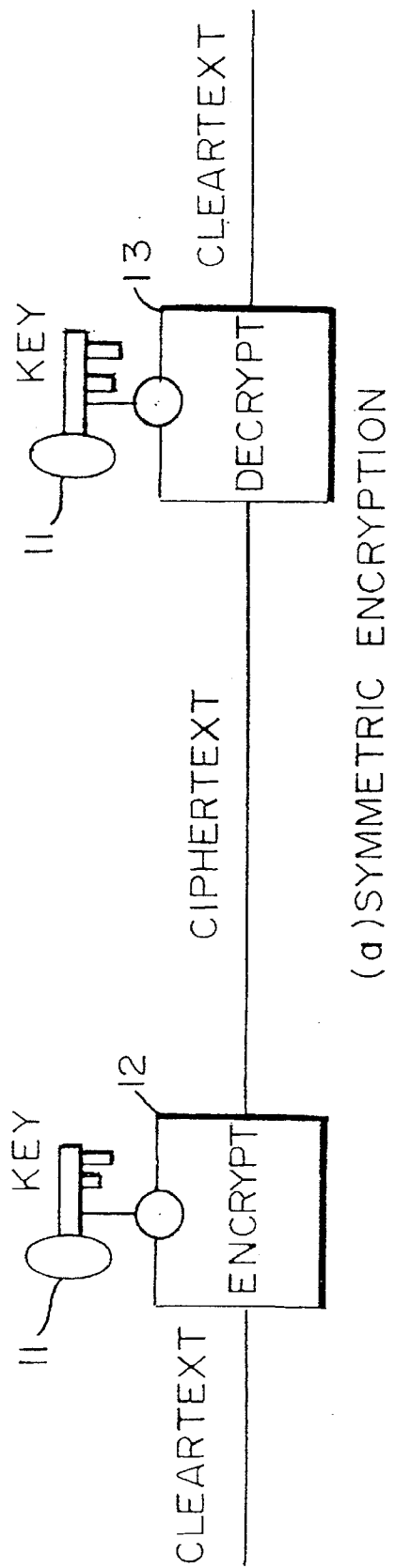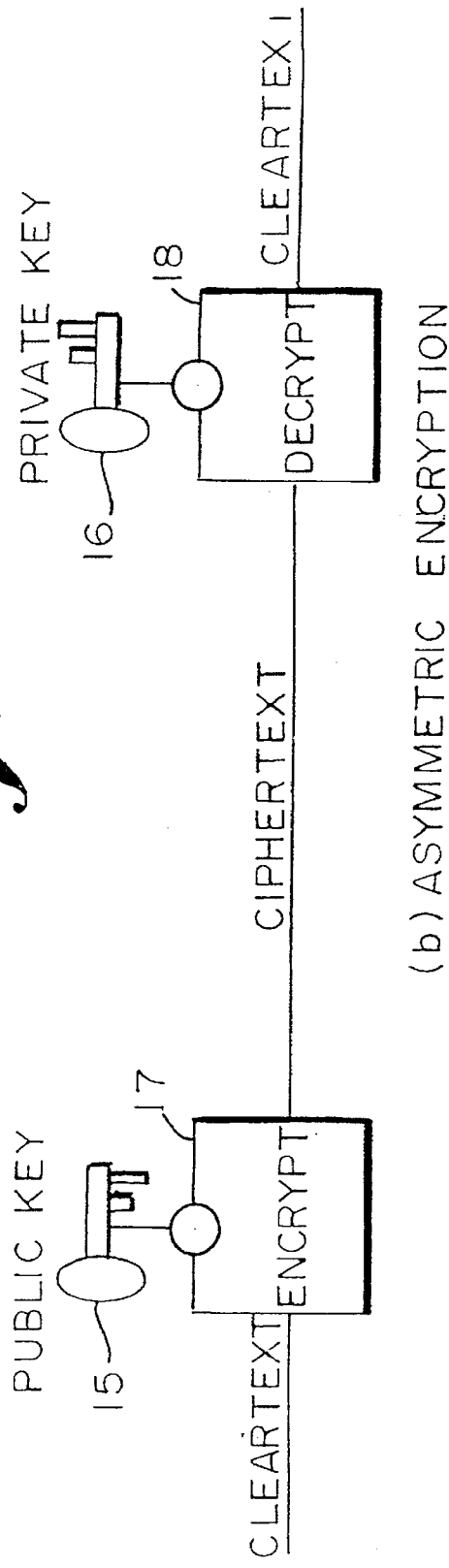

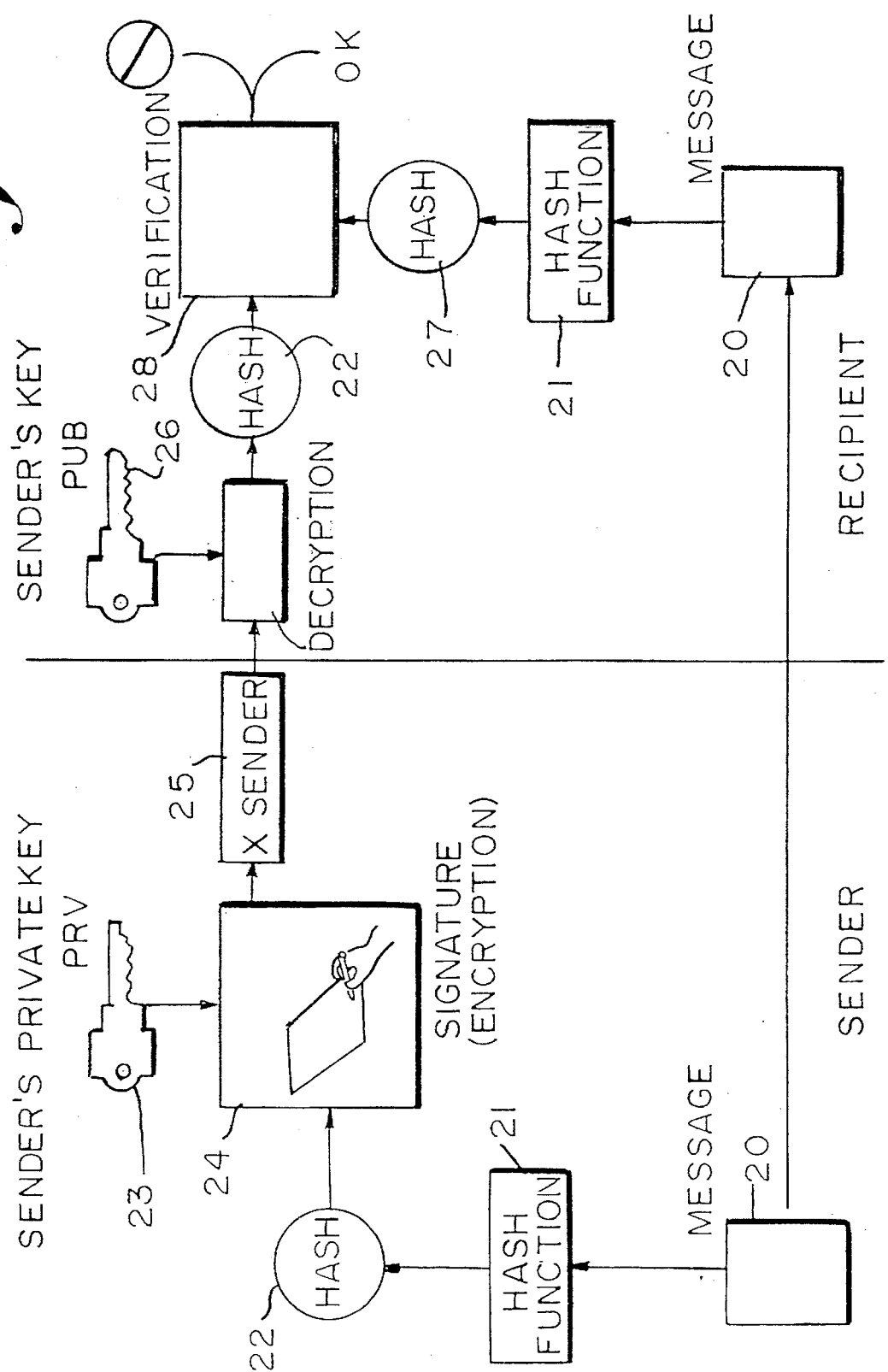

METHOD FOR SECURELY USING DIGITAL SIGNATURES IN A COMMERCIAL CRYPTOGRAPHIC SYSTEM

This is a continuation of application Ser. No. 08/277,438, filed on Jul. 19, 1994, which was abandoned upon the filing hereof.

BACKGROUND OF THE INVENTION

This invention relates to digital signatures. More particularly, this invention relates to the use of digital signatures and certificates for digital signatures in a commercial cryptographic system for enforcing security policies and authorization requirements in a manner that reduces risks to the users.

Public-key cryptography is a modern computer security technology that can support the creation of paperless electronic document systems, providing that the user's digital signature on an electronic document, i.e., the user's electronic authentication and verification of the electronic document, can be given sufficient practical and legal meaning. Such paperless electronic document systems, or "document architectures," will encompass not only trading partners operating under standard bilateral contracts but also global multilateral systems in which any entity can, in theory, correspond with any other entity in a legally provable manner, assuming that proper security controls are observed throughout.

These systems will have enormous commercial significance because, in many cases, cost reductions on the order of 10-to-1 can be realized over current paper transaction procedures. This improvement is sufficiently dramatic such that many organizations would, for economic and competitive reasons, be compelled to use them once their practicality had been demonstrated.

No one disputes that paper is a bothersome anachronism in the electronic world or that verifying pen-and-ink signatures is costly and error-prone. At least with paper, however, the signer retains the basic "contextual controls" of document preparation and physical delivery. On a digitally signed electronic document, on the other hand, a signer controls only the encoded signature. All time, place and manner controls are absent, and nothing distinguishes a valid user signature from one fraudulently produced by another user who somehow obtained the first user's smart card and PIN. It would not take too many multi-million or multi-billion dollar losses to erase all the savings produced by this "newfangled" office-automation technology. Therefore, digital signatures will see early use only in consumer "electronic coin purse" applications, where exposure is low, and in wholesale financial transfers, as to which extremely tight security procedures are already the norm. However, these uses will have little general commercial impact.

Thus far, major corporations and banks have declined to invest in these technologies due to lack of well-defined risk models and auditing standards and due to uncertainties regarding legal and liability issues. Serious investments to commercialize digital signatures will occur only after leading national auditing and legal experts have ruled that these systems contain adequate security controls to warrant reliance in mainstream intra- and inter-corporate business transactions, typically in the $10,000 to $10 million range. In order for this goal to be achieved, security controls must be formulated to reduce the risks of participants in digital signature document systems to the absolute lowest level technically achievable.

There are two types of cryptographic systems in which digital signatures have been used: symmetric and asymmetric cryptosystems. FIG. 1 illustrates the use of symmetric and asymmetric algorithms for encryption. In symmetric (conventional) cryptography, as shown in FIG. 1(a), the sender and recipient of a communication share a secret key 11. This key is used by the sender, the originator of a communication, to encrypt the message 12 and by the recipient of the communication to decrypt the message 13. It may also be used by the recipient to authenticate a message by having the sender use the secret key to compute some function such as a Message Authentication Code (MAC) based upon the message; the recipient thus can be assured of the identity of the originator, because only the sender and the recipient know the secret key used to compute the MAC. DES is an example of a symmetric cryptosystem.

In asymmetric (public key) cryptography, shown in FIG. 1(b), different keys are used to encrypt and decrypt a message. Each user is associated with a pair of keys. One key 15 (the public key) is publicly known and is used to encrypt messages 17 destined for that user, and the other key 16 (the private key) is known only to that user and is used to decrypt incoming messages 18. Since the public key need not be kept secret, it is no longer necessary to secretly convey a shared encryption key between communicating parties prior to exchanging confidential traffic or authenticating messages. RSA is the most well-known asymmetric algorithm.

A digital signature, however, is a block of data appended to a message data unit, and allows the recipient to prove the origin of the message data unit and to protect it against forgery. Some asymmetric algorithms (e.g., RSA) can also provide authentication and non-repudiation through use of digital signatures. In order to sign data, the sender encrypts the data under his own private key. In order to validate the data, the recipient decrypts it with the sender's public key. If the message is successfully decrypted using the sender's public key, the message must originally have been encrypted by the sender, because the sender is the only entity that knows the corresponding private key. Using this method of signing documents, the encrypted message is bound to the signature, because the recipient cannot verify the message without decrypting the signature data block. The signature-encrypted message can then be encrypted to the recipient using the recipient's public key, as usual.

Digital signatures may also be formed using asymmetric encryption algorithms as described below and as illustrated in FIG. 2. To sign a message, the message 20 is first digested (hashed) into a single block 22 using a one-way hash function 21. A one-way hash function has the property that, given the digest, it is computationally infeasible to construct any message that hashes to that value or to find two messages that hash to the same digest. The digest 22 is then encrypted with the user's private key 23, and the result 24 is appended to the encrypted or unencrypted message as its signature 25. The recipient uses the sender's public key 26 to decrypt the signature 25 into the hash digest 22. The recipient also digests (hashes) the message 20, which has been received either unencrypted or encrypted and then decrypted by the recipient, into a block 27 using the same one-way hash function 21 used by the sender. The recipient then verifies 28 the sender's signature by checking that the decrypted hash digest 22 is the same as the hashed message digest 27.

Separating the signature from the message in this way, i.e., not requiring the sender and recipient to encrypt and decrypt the entire message in order to verify the signature, greatly reduces the amount of data to be encrypted. This is important because public key algorithms are generally substantially slower than conventional algorithms, and processing the entire message in order to verify a signature would require a significant amount of time. The signature process also introduces redundancy into the message, which, because the message must hash to the specified digest, allows the recipient to detect unauthorized changes to the message.

A digital signature provides the security services of (a) integrity, because any modification of the data being signed will result in a different digest and thus a different signature; (b) origin authentication, because only the holder of the private key corresponding to the public key used for validation of the signature could have signed the message; and (c) non-repudiation, as irrevocable proof to a third party that only the signer, and not the recipient or its employees, could have created the signature. A symmetric secret key authenticator, e.g. the X9.9 FLAC, does not provide these services, since either of the two parties can create the authenticator using their shared key.

Several of the mechanisms discussed herein assume the ability to attach multiple signatures or cosignatures to a document. RSA Data Security, Inc., "PKCS #7: Cryptographic Message Syntax," 1993, which is hereby incorporated by reference, defines a useful format for this purpose. Each signature structure on a document will contain an indication of the certificate needed to validate the signature along with a bit string containing the actual signature. Additionally, other information relevant to the particular signer may be included in an individual signature computation. This per-signer information may be included in the signature computation as "signature attributes."

In order for one user to identify another user for transmission of a message in a way that ensures the second user's possession of a private key, the first user must be able to obtain the other user's public key from a trusted source. A framework for the use of public key certificates was defined in CCITT, "X.509: The Directory: Authentication Framework," April, 1993 ("X.509"), which is hereby incorporated by reference. These basic public key certificates bind a user's name to a public key and are signed by a trusted issuer called a Certification Authority (CA). Besides containing the user's name and public key, the certificate also contains the issuing CA's name, a serial number and a validity period.

Although X.509 does not impose any particular structure on the CAs, many implementations find it reasonable to impose a hierarchical structure in which each CA (in general) certifies only entities that are subordinate to it. Hence, we can construct a hierarchy of Cas, as shown in FIG. 3, in which the higher level CAs 31 (perhaps banks) sign the certificates 34 of the CAs 32 beneath them (e.g., companies), and the lowest level of CAs 32 sign user 33 certificates 35. At the top of this hierarchy (not shown) are a relatively few other root CAs, perhaps one per country, that may "cross-certify" each other's public keys (root keys).

Various security architectures define mechanisms to construct a certification path through the hierarchy to obtain a given user's certificate and all CA certificates necessary to validate it. These architectures share the common characteristic that a user need trust only one other public key in order to obtain and validate any other certificate. The trusted key may be that of the top-level CA (in a centralized trust model) or of the local CA that issued the user's certificate (in a decentralized model).

Certificates also contain an expiration date. If it is necessary to cancel a certificate prior to its expiration date, such as if the name association becomes invalid or the corresponding private key is lost or compromised, the certificate may be added to the CA's certificate revocation list (CRL) or "hot list." This list is signed by the CA and widely distributed, possibly as part of the CA's directory entry. The certificate remains on the CRL until the certificate's expiration date.

Often certain information concerning an entity or CA needs to be made available in a trusted manner. In a secure X.500 Directory, this information would be retrieved via standard Directory operations and the result would be signed by the Directory. In the absence of such a secure X.500 implementation, this information is placed in an attribute certificate, which is signed by a CA in the same manner as the public key certificate. Attribute certificates would be created on presentation of the proper credentials by the user. For example, the user would present his public key certificate and prove he possesses the corresponding private key, as one form of identification. Attribute certificates are linked to the user's basic public key certificate by referencing the basic certificate's serial number and are revoked by an identical parallel CRL mechanism. Attribute certificates are discussed further in ANSI X9F1, "X9.30 Part 3: Certificate Management for DSA," June, 1994, and U.S. Pat. Nos. 4,868,877, 5,005,200 and 5,214,702, which are all hereby incorporated by reference.

An attribute certificate is a structure separate from a public key certificate because proper separation of duties may often require that the CA that issues the attribute certificate be different than the CA that issues the public key certificate. A central CA might rarely of itself possess the required security or authority to "sign for" all of a user's authorizations. Having separate CAs generate various types of attribute certificates distributes risks more appropriately. In addition, the defined attributes may not be required for all domains, networks or applications. The need for these attributes and for additional domain-specific attributes is determined by each domain.

The user's basic public key certificate remains X.509 compatible, allowing its use with other applications and allowing use of commercial products for certificate generation.

It is desirable to be able to construct a trusted organization that utilizes digital signature and certificate mechanisms to enforce a security policy defined by rules within this organizational structure.

It is also desirable to use digital signature and certificate mechanisms to encode industry-wide security policy and authorization information into the signatures and certificates in order to permit the verifier of a signature to decide whether to accept the signature or certificate as valid, thus accommodating and easing electronic commerce business transactions.

It is further desirable to reduce the risks associated with digital signature systems, particularly with end-user smart cards, by building on this use of public key certificates and attribute certificates.

It is further desirable to prevent the use of such a digital signature system by any party that might purport to "accept" a transaction in contravention of the applicable authorization certificates when that party had not signed the applicable "system rules" agreement pertaining to that system of communicating signer authorization.

SUMMARY OF THE INVENTION

These and other objects of the invention are accomplished in accordance with the principles of the invention by providing a system for securely using digital signatures in a commercial cryptographic system that allows industry-wide security policy and authorization information to be encoded into the signatures and certificates by employing attribute certificates to enforce policy and authorization requirements. In addition to value limits, cosignature requirements and document type restrictions that can be placed on transactions, an organization can enforce with respect to any transaction geographical and temporal controls, age-of-signature limitations, preapproved counterparty limitations and confirm-to requirements by using attribute certificates for the transacting user. Restrictions on distribution of certificates can be set using attribute certificates. Certificates can be used also to ensure key confinement and non-decryption requirements of smartcards in this system.

BRIEF DESCRIPTION OF THE DRAWINGS

The above and other objects and advantages of the invention will be apparent upon consideration of the following detailed description, taken in conjunction with the accompanying drawings, in which the reference characters refer to like parts throughout and in which:

FIG. 1 is a diagram showing the prior art use of symmetric and asymmetric algorithms for encryption;

FIG. 2 is a flow chart illustrating the prior art process of a digital signature using an asymmetric encryption algorithm;

DETAILED DESCRIPTION OF THE INVENTION

Figure 3:
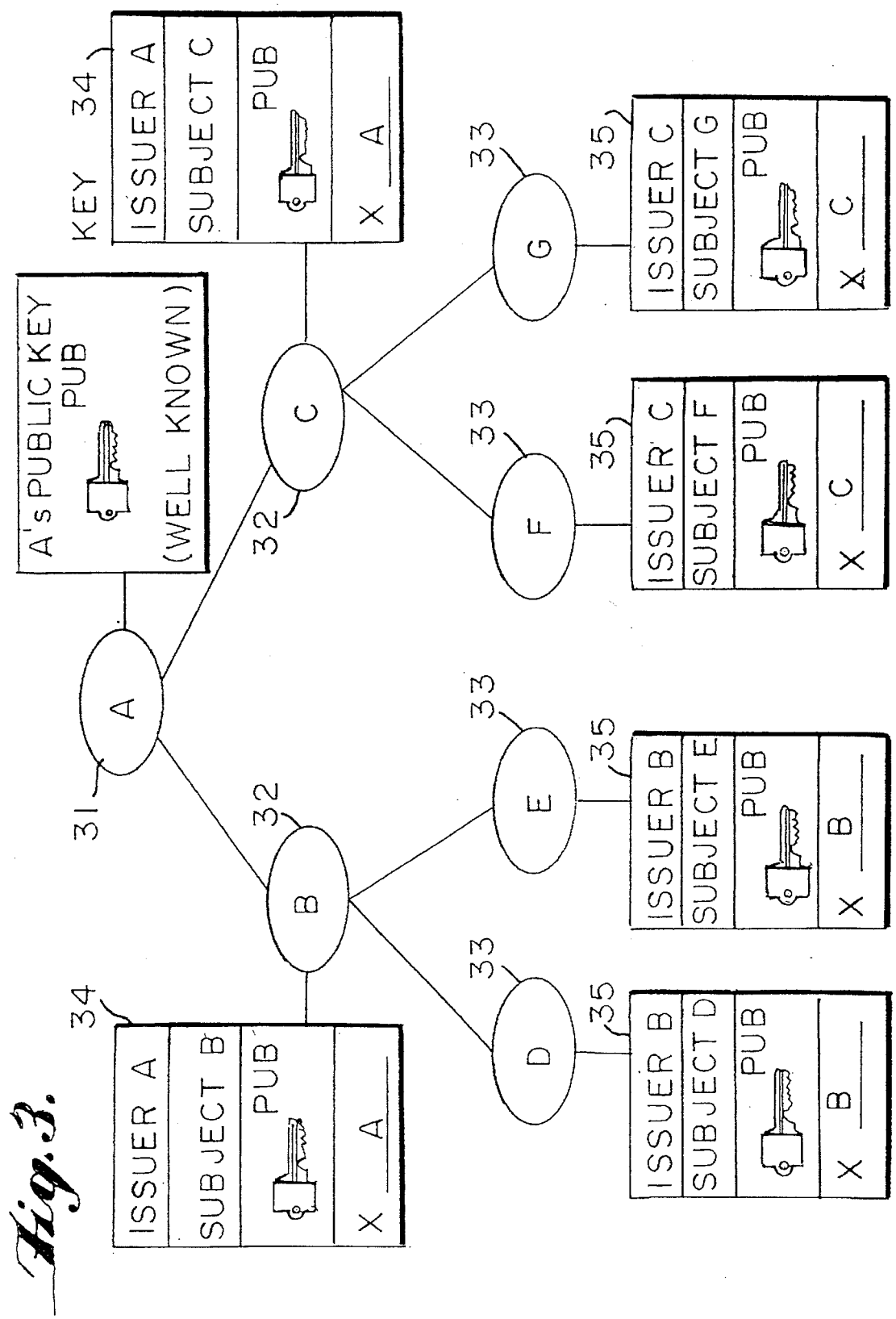
FIG. 3 is a diagram showing a hierarchy of signature certification authorities.

The following general principles and philosophies are reflected in the signature verification model defined in this invention. First, CA and user certificates can contain attributes that document the conditions and assumptions under which they were created. Verifiers may simply reject all certificates and transactions that do not meet their minimum standards.

Also, attribute certificates may be signed by a user's "sponsor" to signify that the sponsor's signature will be honored for official business if the transaction meets the requirements stated or implied by the attributes. Although typically the user's sponsor will be the user's employer, the model can be extended to include the user's bank, credit card issuer, voting bureau, video rental store, public library or any other entity that might accept the user's signature. This sponsor (authorization) certificate is thus the electronic equivalent of an "affidavit of legal mark," as used in the context of a traditional signature stamp. See Robert Jueneman, "Limiting the Liability of CAs and Individuals Regarding the Use of Digital Signatures," presented to the ABA Section of Science and Technology Certification Authority Work Group, Jul. 2, 1993.

Furthermore, industries may develop "industry policy" statements that establish minimum requirements for signature verification. All participants would sign these multilateral agreements in order to ensure that all counterparties would be bound by the encoded restrictions. Normally, sponsor certificates should be required in all cases, and digital signatures would be deemed otherwise null and void in their absence. Industry-wide policies would also define (1) relevant document types and classes, (2) signer roles and titles, and (3) coded symbols for incorporating by reference standard contractual terms and conditions.

Moreover, there must be strict adherence to the principle that all restrictions can be enforced in an entirely automated manner (i.e., verification "on sight"), without reference to paper agreements or human interpretation, sometimes also termed "fully machineable straight-through processing." In complex and/or high-volume environments, this is required in order to give these security controls credibility in the eyes of audit and legal experts. Reference to trusted third parties should also be minimized to reduce verification latency times.

While these restrictions seem complex, they merely reflect ordinary business procedures made explicit for purposes of machine verification. Formerly, such controls were enforced inside the sponsor's computer systems before sending out the transaction. However, with the advent of multilateral distributed transactions, the verifying user is typically off-line from his sponsor's system, and so the verifier must enforce the sponsor's authorization model, as reflected in the attribute certificates. Once this methodology is specified, office software vendors will develop menu-driven systems to create and manage user attributes, and the cost to user organizations will be relatively low.

Organizational Structure in Certificates

The certificates themselves may reflect the structure of a sponsor organization. Because many authorization decisions are based on the user's position in an organization, the organizational structure and the user's position therein may be specified as part of a user's name. Names in certificates are specified in terms of the X.500 Directory model, as follows.

Figure 4:
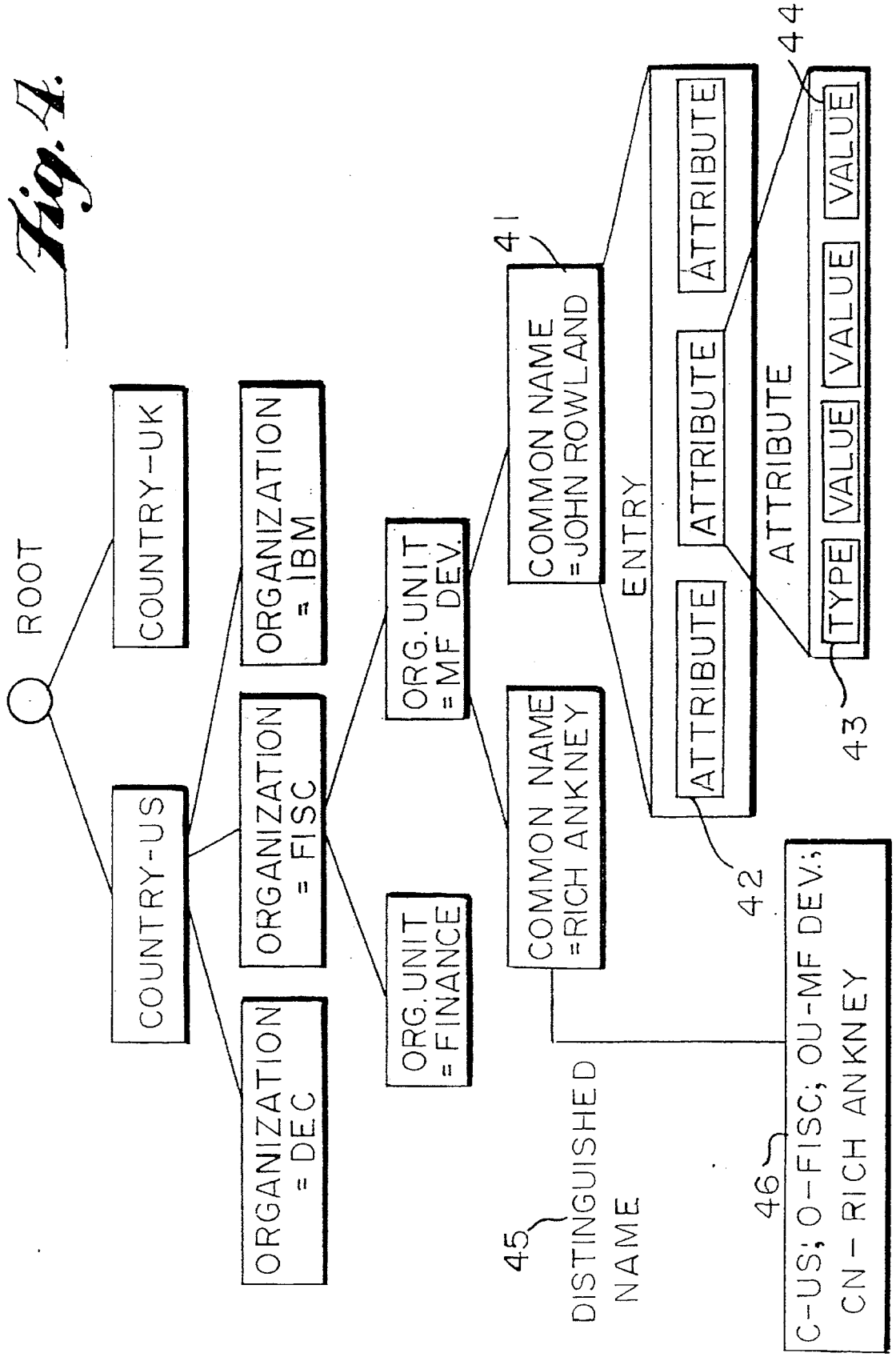
FIG. 4 is a diagram showing a directory information tree (DIT)

The X.500 Directory structure is hierarchical; the resulting distributed database comprises the Directory Information Tree (DIT), as shown in FIG. 4. Each entry 41 is of a specific object class and consists of a set of properties called attributes 42. An attribute 42 consists of a type 43 and one or more values 44. Thus, in an entry of class organization, one attribute is the organizationName; in an entry of class organizationalPerson, attributes might include title and telephoneNumber.

Each entry also has one or more special attribute values used to construct the object's name; this attribute value is the relative distinguished name (RDN) of the entry. An object's distinguished name (DN) 45, which is created by concatenating the relative distinguished names 46 of all entries from the DIT root to the entry, uniquely identifies the object in the global DIT.

Several of the attributes defined in X.500 may be usefully included in the user's attribute certificate. For example, the object class can be used to distinguish between entities (e.g. users and roles) whose distinguished names are of the same form. Also, the title may be used in making authorization decisions.

In addition to the use of the DIT to group entities along organizational lines, X.500 defines several object classes that can be used to construct arbitrary groups of entities. These object classes include the organizational role, whose "role occupant" attribute lists the names of the users who occupy the role, and the group of names, whose "member" attribute lists the names of group members. To convey this information in a trusted way, one could define role and group certificates that convey the names of the role occupants or group members, respectively, and that are signed by a CA, thus enabling use of this feature outside the context of an X.500 directory system.

Group and role certificates may be used in conjunction with a cosignature mechanism to simplify the construction of cosignature requirements. For example, a transaction might require the signatures of three occupants of the "purchasing agent" role. A user may also indicate the role in which he is acting by including the role in the signature computation as a (per-signer) signature attribute. The asserted role may then be matched against a role certificate (or the user's attribute certificate) during verification.

Policy Information in Certificates

It is another embodiment of this invention to encode information regarding a CA's security policy into the attribute certificates of the CA and its subscribers, so that the verifier of a signature can use the information in determining whether to accept a signature as valid. In general, the CA's certificate will convey the rules that a CA uses when making certification decisions, while the user's certificate will convey the information used by the CA when applying these rules.

Attributes in CA certificates can indicate security policy and assurance information for a particular CA. This policy information can also be inherited by subordinate CAs, allowing easy construction of security domains sharing a common policy. Policy attributes in a CA's certificate might, among others, include:

(1) Liability Limitations: the extent to which a CA is liable in the event of various problems (e.g., CA key compromise, defective binding); this might be no liability, full liability or a specific monetary amount.

(2) Trust Specification: a description of which users and CAs a given CA can certify, expressed relative to the CA itself (e.g., "all subordinates"), or to the DIT in general (e.g., "the subtree below Organization ABC"), or to others.

(3) Required Attributes: a list of those attributes in the user's attribute certificates that must be verified against a transaction and/or its context in order for the transaction to be considered authorized. These attributes would be found in the certificate(s) of the sponsor and allow a single authorization certificate to contain authorization attributes for use with multiple applications. Some suggested user authorization attributes are defined later.

(4) Allowable Name Forms: a specification of the allowable name forms that the CA may certify. This information is held as (a) a set of name bindings, which defines the attributes that may be used to name entries of a given object class (i.e., the allowable RDN formats for entries of that class), and (b) a set of structure rules, which defines which object classes may be adjacent (i.e. superior or subordinate) to each other in the DIT, i.e., the order in which object classes may be chained together to form a complete DN. This policy attribute may be used to restrict the type of entities that may sign transactions. For example, for wire transfer applications, it might be desirable to restrict signature capability to the organization itself, rather than to users within the organization, since this is similar to the current mode of operation using DES MACs.

(5) Cross-Certificates: it may be desirable from an efficiency point of view to allow certifying entities and as organizations to cross-certify each other in order to constrain the length of certification paths. On the other hand, it is not desirable to allow certification paths to contain arbitrary numbers of cross certificates, as it is difficult to determine the level of trust in the entity at the other end. Many certification architectures restrict certification paths to contain only one cross-certificate. To accommodate a wider range of policies, an attribute may be added to the attribute certificate associated with the cross-certificate indicating that the cross-certifier explicitly allows the use of cross-certificates issued by the CA being cross-certified.

Attributes in a user's or entity's attribute certificate may represent the information verified by the CA when creating the certificate for the entity. Policy attributes in a user's certificate might, among others, include:

(1) Binding Information: the criteria used to bind the public key to the identity of the entity being certified. This includes (a) the method of delivery, such as being presented in person, by authorized agent, by mail or by another method; (b) the method of identification, such as by reasonable commercial practices, verified by trusted third party, dual control, fingerprint check, full background investigation or another method; (c) the identification documents presented to the CA; and (d) the subject's entity type, i.e. individual, corporation or other.

(2) Trusted Third Parties: the names of any trusted third parties or agents involved in the binding process.

(3) Roles: it may be useful for authorization purposes to indicate which roles (both internal and external to the organization) a user may exercise. This is in contrast to a role certificate, which would be issued to the role and contain the names of all occupants.

(4) Relative Identity: a CA may wish to certify only a portion of the DN of an individual. In particular, the CA might disclaim liability for correctness of an individual's personal name, since, under legal Agency principles, the individual's signature is binding on their organizational sponsor in any event. Consider the name:

C=US; O=Bankers Trust; OU=Global Electronic Commerce; CN=Frank Sudia; TI=VP

The CA might certify only the validity of the organization, organizational unit and title portions of the individual's distinguished name, all of which are easy to verify, while the personal name would only be "reasonably believed accurate." In view of the relative ease of obtaining false identity papers, this avoids the need for prohibitively expensive background investigations. Such an identification can be relied on in an ordinary commercial setting but not in a proceeding concerning a will or inheritance, for example.

(5) Absolute Identity: we define relative identity as the user's identity "relative" to his organizational sponsor. Put another way, we certify all elements of the user's "business card identity," except his personal name. As a special case, some CAs might undertake to certify the absolute identity of selected users, say the children of wealthy clients, diplomats or national security operatives, almost certainly bolstered with biometric techniques. This would be rare and is presented here only for completeness in order to round out the "relative identity" concept.

Authorization Information in Certificates

Attributes may convey restrictions that control the conditions under which a signature is valid. Without such restrictions, the risk of forgery would be considered excessive, since an electronic signature can be affixed to almost any digital document by anyone possessing the user's smart card and personal identification number (PIN). In the electronic environment, the normal contextual controls of document creation and physical delivery are either weak or nonexistent.

Figure 5:
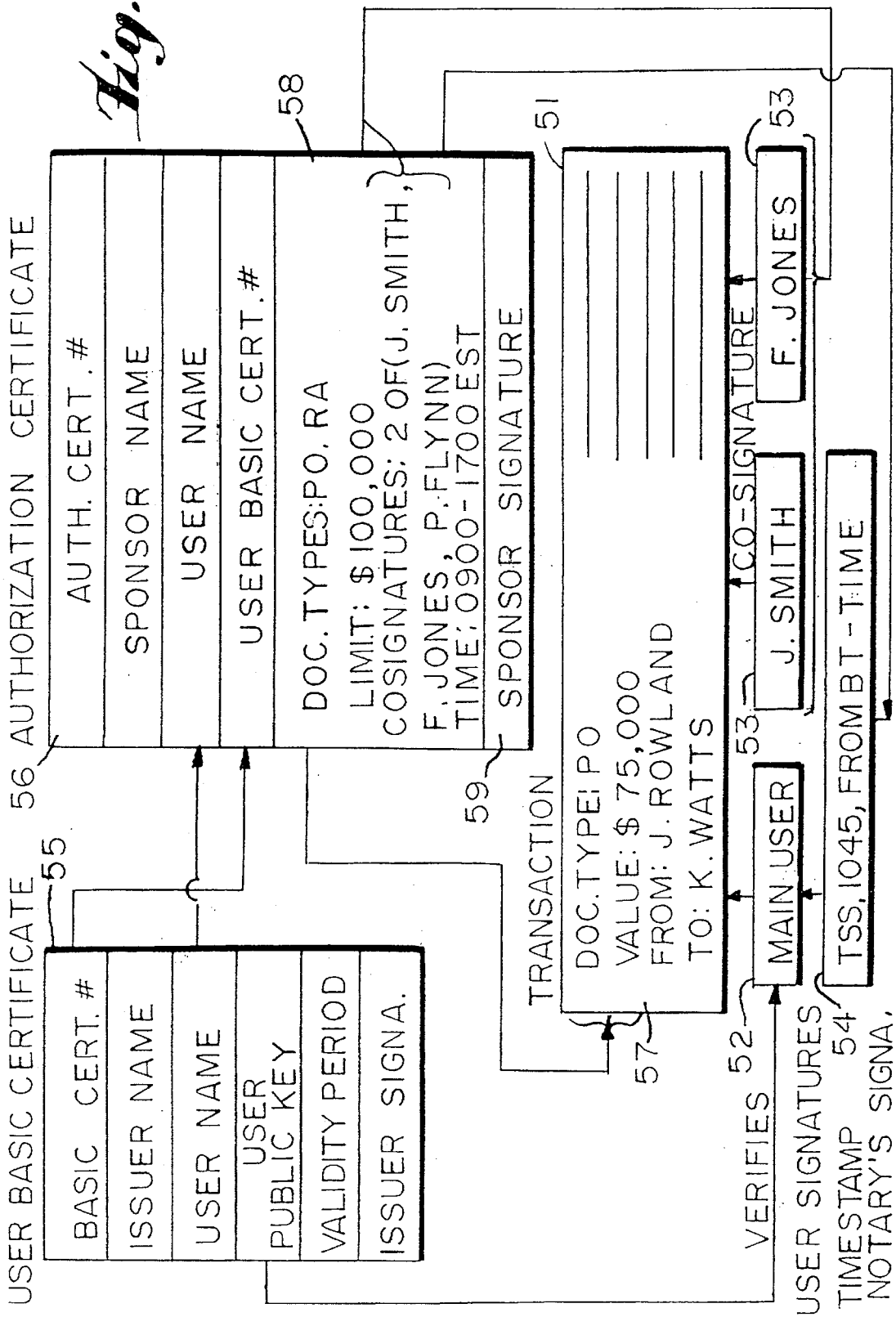
FIG. 5 is a diagram showing an example of an authorization certificate.

Even authentic users are hardly trustworthy to undertake free-form offline commitments, and organizations will thus welcome the capability to positively restrict the scope of express signature authorization. Such authorization attributes might, in addition to standard X.500 attributes, include Transaction Limits, Cosignature Requirements, Document Types, Authorized Signatories, Geographical and Temporal Controls, Age of Signature, Preapproved Counterparties, Delegation Controls, and Confirm-To Requirement. These attributes can be encoded in one or more authorization certificates signed by the signer's organizational sponsor or by an external CA acting on behalf of the organization. An example of an authorization certificate and an associated transaction is shown in FIG. 5.

When a recipient user (verifier) receives a transaction 51 from a sending user, the recipient first uses the sender's basic key certificate 55 to verify the sender's signature 52 on the transaction 51. As will be described in greater detail below, the recipient also uses the sender's authorization certificate 56, signed by the sender's sponsor 59, to verify the cosignatures 53 and timestamp notarization 54 appended to the transaction 51 and to verify that the attribute values 57 of the transaction 51 fall within the authorized attribute values 58 as specified in the authorization certificate 56.

Figure 6:
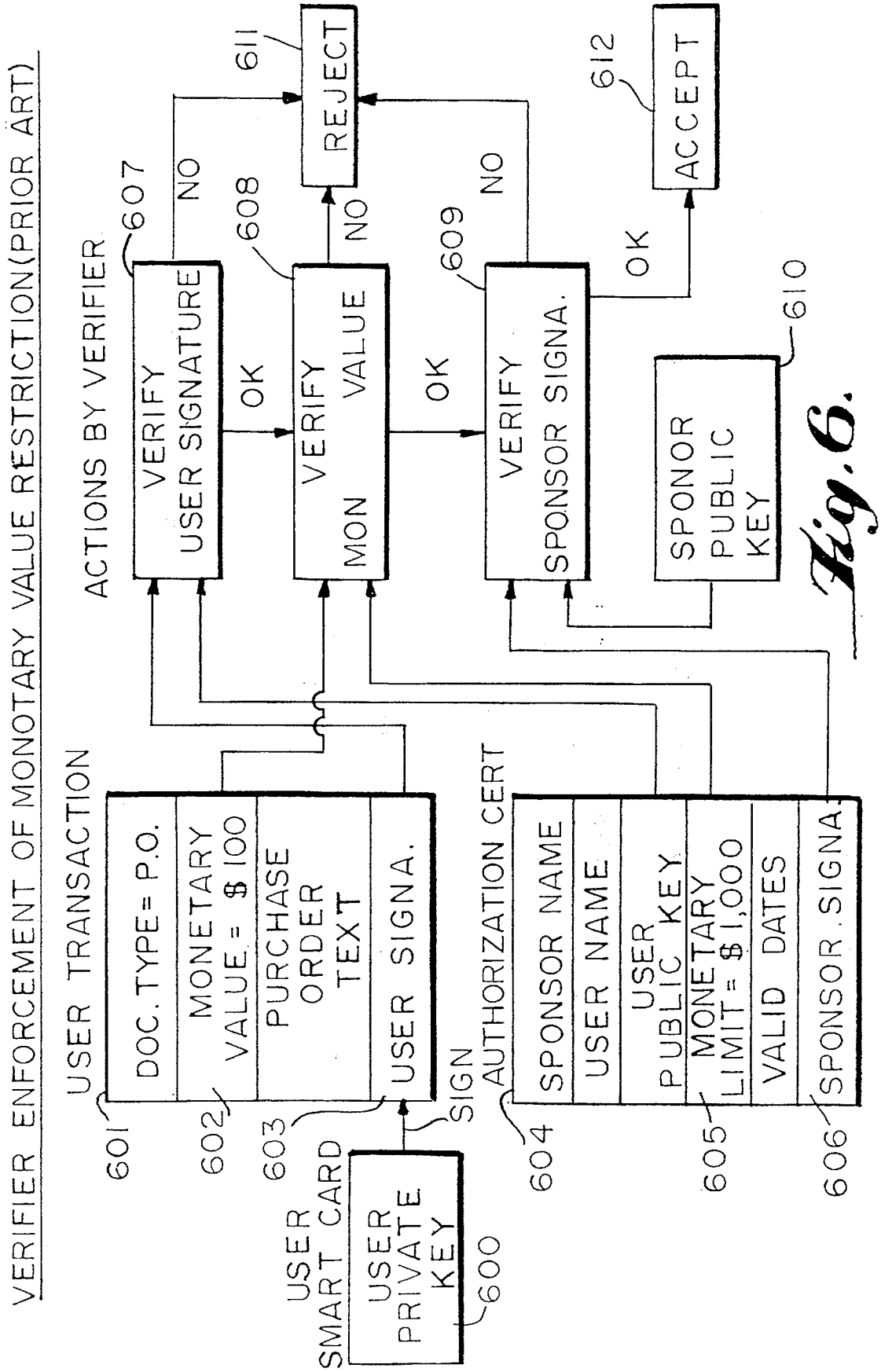
FIG. 6 is a flow chart illustrating the prior art process of verifier enforcement of a transaction monetary value restriction.

The user may be subject to transaction limits that control the value of transactions or other documents that the user may initiate. The user's signature will be valid only on transactions originated either up to a certain monetary limit or between two monetary value boundaries. Accordingly, as shown in FIG. 6, the sending user sends a transaction 601 signed 603 by the sender (actually by the user's smart card 600 containing his private key) and appends thereto an authorization certificate 604. The verifier uses the authorization certificate 604 to verify 607 the user's signature 603 and to verify that the transaction monetary value 602 falls within the transaction limit attribute value 605 in the authorization certificate 604. The verifier also verifies 609 the sponsor signature 606 on the authorization certificate 604 using the sponsor's public key 610. If any of these signatures and attribute values does not verify, the transaction is rejected 611. If verification is complete, the transaction is accepted 612.

Figure 7:
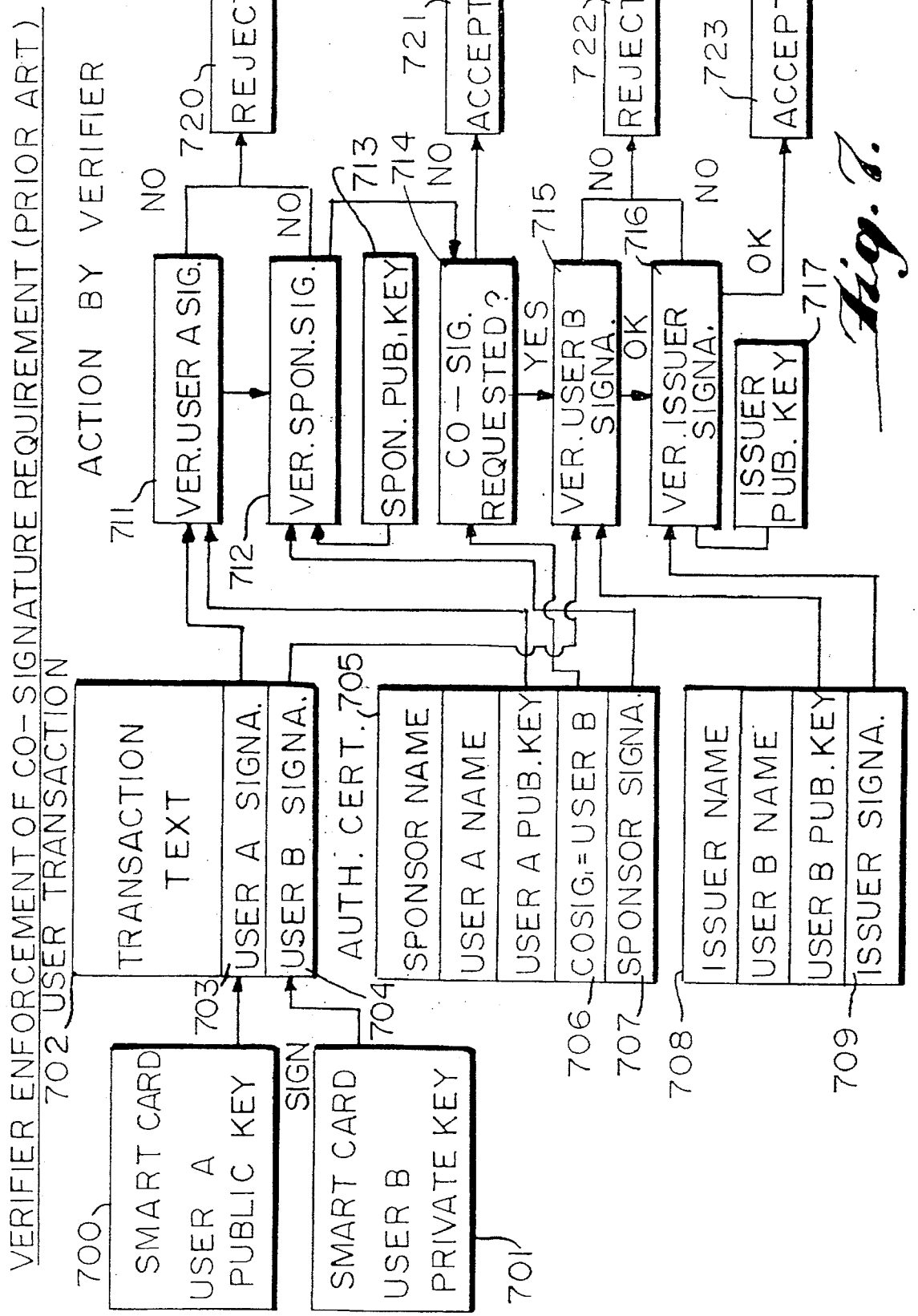
FIG. 7 is a flow chart illustrating the prior art process of verifier enforcement of a transaction cosignature requirement.

With regard to cosignature requirements, additional signatures may be required in order for a given signature to be considered valid. Quorum and weighting mechanisms can be used to construct fairly elaborate checks and balances for explicitly governing the level of trust in each user. The particular sequence or order of required signatures may also be specified. Referring to FIG. 7, sending user A sends a transaction 702 signed 703 by his own smartcard 700 and, if user B's cosignature is required on the transaction 702, signed 704 by the smartcard of user B 701. Sending user A also appends his own authorization certificate 705 to the transaction 702. The verifier uses the authorization certificate 705 to verify 711 user A's signature 703, and uses the sponsor's public key 713 to verify 712 the sponsor's signature 707 on the authorization certificate 705; if either signature does not verify, the transaction is rejected 720. If a cosignature value 706 is required 714 by the authorization certificate 705, the recipient enforces the requirement by verifying 715 cosigner user B's signature 704 on the transaction 702, and then checks cosigner user B's public key certificate 708 by verifying 716 the signature 709 of the certificate issuer, using the issuer's public key 717. If the signature of either user B or his certificate's issuer does not verify, the transaction is rejected 722.

The use of cosignatures allows an organization to effectively define checks and balances, and to explicitly specify the level of trust in a user. The use of cosignatures also greatly reduces the risks that result from inadvertent compromise of a private key due to theft, misuse or misplacement of a smartcard or PIN. In particular, it is believed that the ability to require cosignatures, value limits and related controls will enable organizations to carefully manage and fine-tune all signature authorizations, thereby giving them all the tools needed to manage and limit their risks. Use of cosignatures further allows distribution of the authorization function over multiple locations and hardware platforms, with the resultant minimization of risks that might result from access control failures on one of those platforms. See U.S. Pat. Nos. 4,868,877, 5,005,200 and 5,214,702.

Authorization signatures, which must meet the restrictions specified in the signer's certificate, can also be distinguished from other cosignatures by including the signature purpose as a signature attribute and by requiring that an indication of the signature purpose be included in the data being signed. This signature-purpose attribute might require the values of: (a) an authorization signature appropriate to the document, (b) an authorization cosignature appropriate to the document, where the cosigner's certificate has sufficient authority to authorize the document, and (c) a witness cosignature, where the cosigner's certificate does not by itself have sufficient authority to authorize the document. Signature purpose encodings are discussed in draft ANSI standard X12.58 Version 2 (Appendix) issued by the Data Interchange Standards Association (DISA), which is hereby incorporated by reference.

Figure 8:
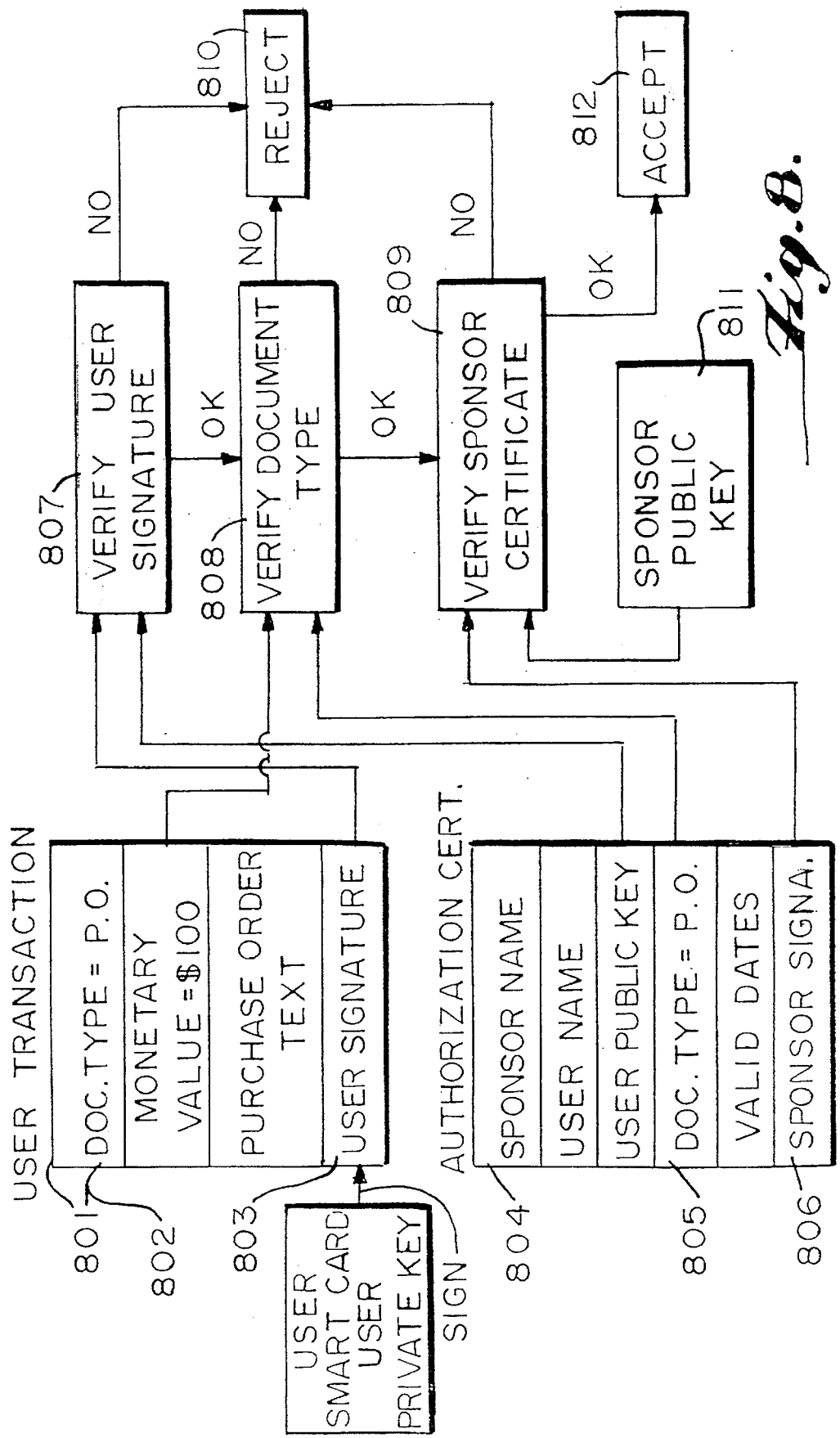
FIG. 8 is a flow chart illustrating the process of verifier enforcement of a transaction document-type restriction.

The user can also be restricted to signing only particular document types, such as ordinary correspondence, purchase orders, specified EDI transaction types, business contracts, specified financial instruments, etc., as defined by industry-wide policies. It may also be desirable for efficiency to exclude certain large classes of transactions and documents. Referring to FIG. 8, the recipient enforces the document-type restriction in the sender's transaction 801 by first verifying 807 the sender's signature 803 on the transaction and by then verifying 808 the document type attribute value 802 within the transaction 801 to enforce the document type restriction 805 within the sender's authorization certificate 804. The recipient then verifies the authorization certificate 804 by using the sponsor's public key 811 to verify 809 the sponsor's signature 806. If either a signature or the attribute restriction does not verify, the transaction is rejected 810.

An organization can indicate that there are specific authorized signatories, that is, that only specific individuals can "sign for" the organization, similar to a standard "corporate resolution" to this effect. This might complement the document-type concept, as an additional control on signing of "corporate" document-types. This restriction can be implemented by specifying that a cosignature is required in which the cosigner's title (in its distinguished name) must be equal to one on a specified list contained in a authorization certificate. This is in lieu of naming a list of one or more required cosigners.

Figure 9A:
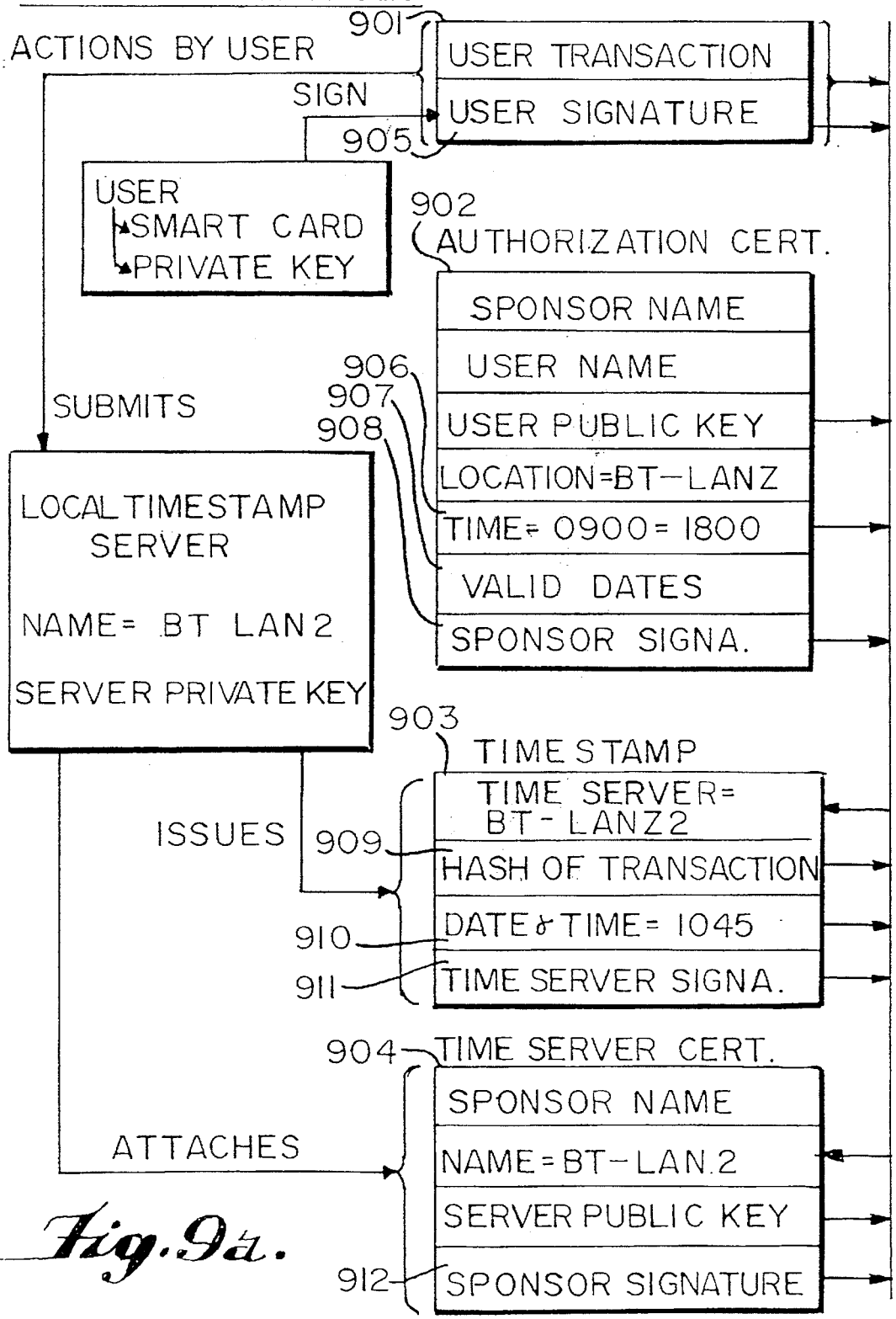
FIG. 9 is a flow chart illustrating the process of verifier enforcement of a transaction geographical and temporal control.
Figure 9B:
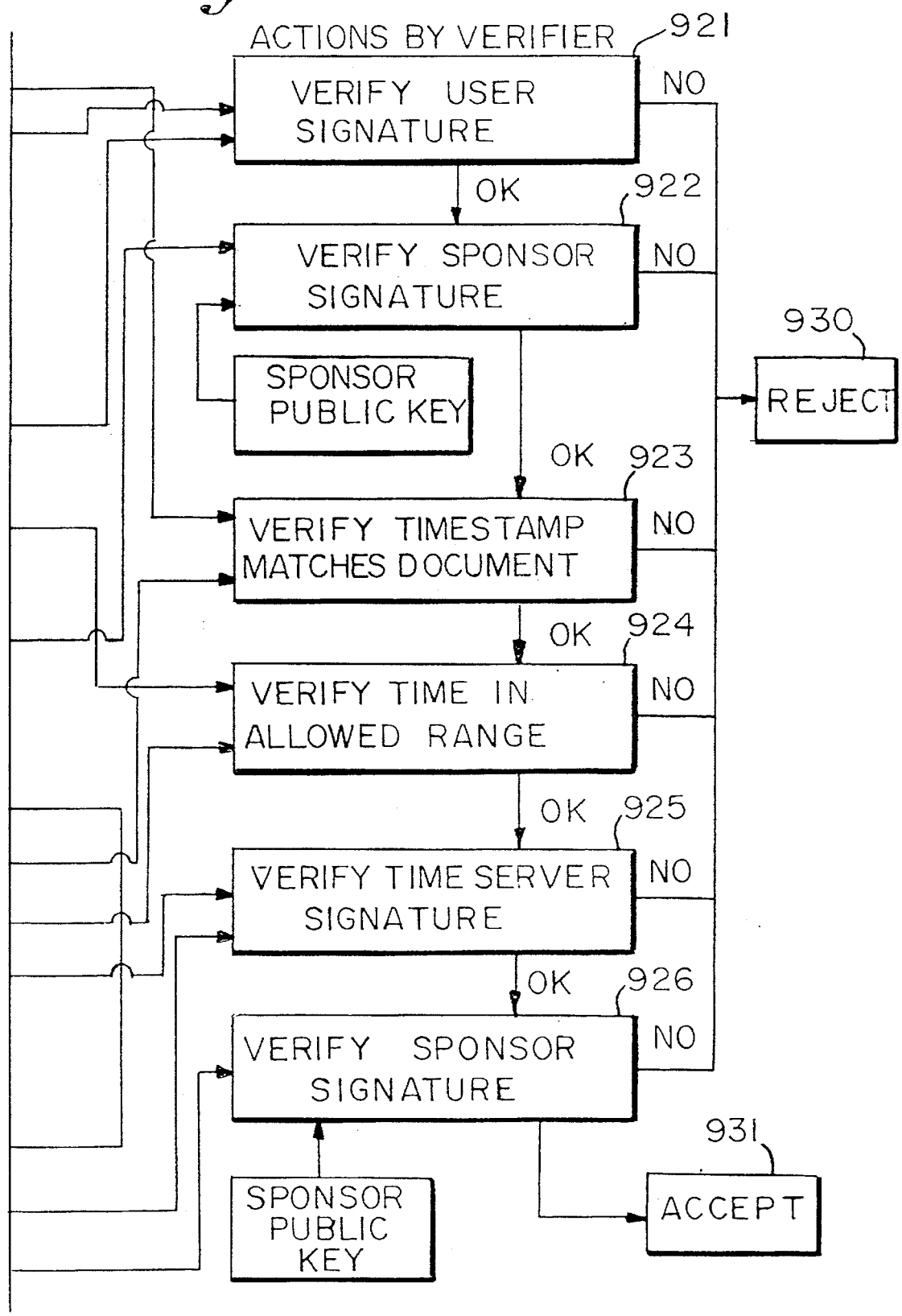

Geographical and temporal controls include locations and time periods from which transactions are considered valid. Use of a local trusted "timestamp notary" is assumed. Such a notary would append a trusted timestamp to the originator's signature on a document and would then sign the result. Thus, time-of-day and day-of-week restrictions would normally coincide with the work-week of the user's locale. Also, location information would be associated with the notary so as to restrict access to a specific network segment, typically the user's assigned work area. The "granularity" of location controls would depend on the network architecture. The signer or the signer's computer system must attach a certified timestamp from a specified local server to the transaction, or else the verifier cannot accept the transaction and the signer's sponsor will not be bound by it. As shown in FIG. 9, the sending user attaches to the transaction 901 an authorization certificate 902, as usual, an authorized timestamp 903 and a time server certificate 904. The recipient verifies 921 the sender's signature 905 on the transaction 901 and verifies 922 the sponsor's signature 908 on the authorization certificate 902. The recipient then (1) verifies 923 that the timestamp transaction text hash 909 matches the result of the text of the transaction 901 hashed with a known hash function, (2) verifies 924 that the time and date 910 on the transaction timestamp 903 fall within the authorized time and date 906 attribute values as specified in the authorization certificate 902, (3) verifies 925 the time server signature 911 on the timestamp 903, and (4) verifies 926 the sponsor's signature 912 on the time server certificate. If all these conditions are satisfied, the transaction is accepted 931; if not, the transaction is rejected 930.

Figure 10:
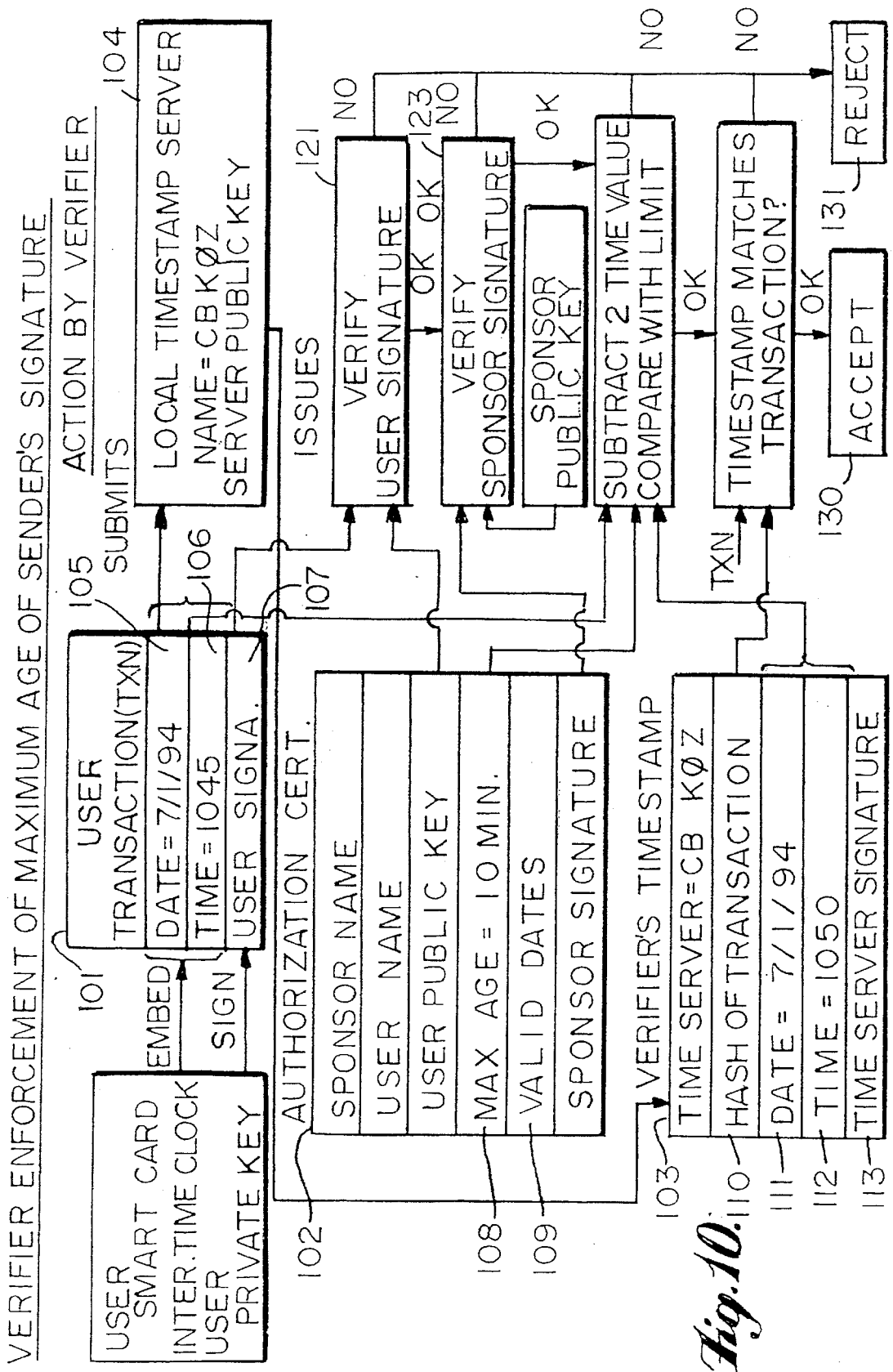
FIG. 10 is a flow chart illustrating the process of verifier enforcement of a maximum age of sender's signature restriction.

Furthermore, a document may not be valid unless the signature is verified within some specified time period. For high-value transactions this age-of-signature attribute period would be quite short, while for more normal transactions, especially those sent via store-and-forward systems such as X.400, a longer interval (such as two days) would be appropriate. FIG. 10 shows enforcement by a recipient of the age-of-signature attribute value. The time of verification would be provided using a receipt 103 signed by a trusted timestamp service 104 containing, at a minimum, the recipient's name and the signature from the original transaction. The verifier must submit a timestamped copy of the original signature that is dated promptly after the time and date of the original transaction, or else the sponsor will reject it. As shown in FIG. 10, the recipient (verifier) verifies 121 the sender's signature 107 on the transaction 101 and verifies 122 the sponsor's signature 115 on the authorization certificate 102. The recipient then verifies 123 that the difference between the date 105 and time 106 on the transaction 101 and the date 111 and time 112 on the timestamp 103 is within the age-of-signature attribute restriction 108 in the authorization certificate 102. The recipient also verifies 124 that the hash 110 of the transaction 101 within the trusted timestamp 103 matches the text of the transaction 101. If all these conditions are satisfied, the transaction is accepted 130; if not, the transaction is rejected 131.

A "preapproved counterparties" attribute value restricts an entity to dealing only with some specified set of known trustworthy partners. This is a common requirement in dial-up home banking systems, which typically require that all authorized payees be specified in advance. Another way of stating this is that "free-form transfers" are forbidden. Sponsors realize that, in case of an error, they stand a better chance of successfully reversing the error when dealing with a large, solvent and creditworthy party than when dealing with a small, unknown and unauthorized one. Separate certificates can be issued for each counterparty in order to prevent a competitor from obtaining the user's customer list (other than himself) in a single certificate. The approved counterparty can be coded either as a common name, a distinguished name, or the hash value of either the distinguished name or the counterparty's public key. In order to claim the benefit of the transaction, the verifier must submit a certificate that matches the encoded counterparty value.

Figure 11A:
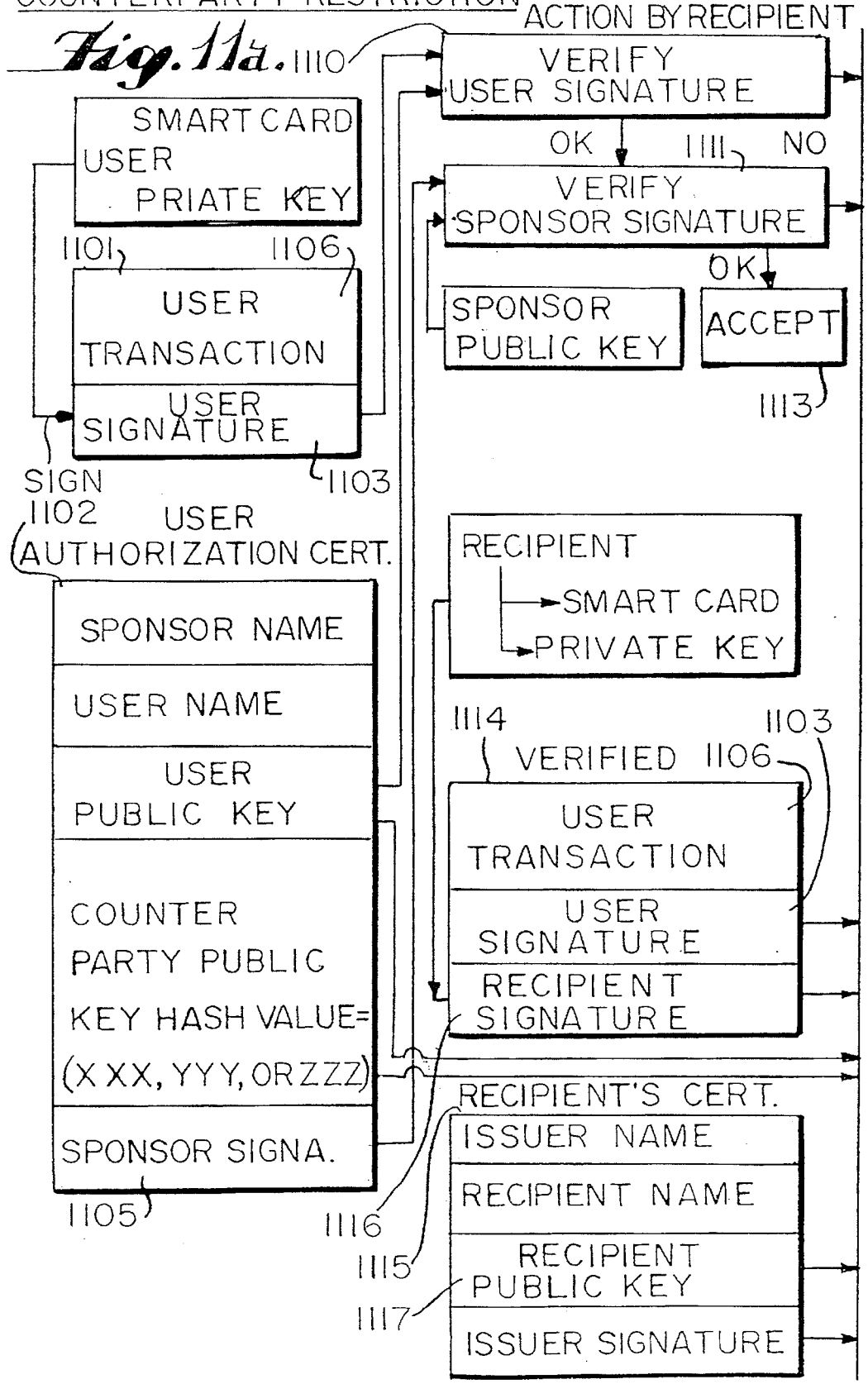
FIG. 11 is a flow chart illustrating the process of verifier and sponsor enforcement of a pre-approved counterparty restriction.
Figure 11B:
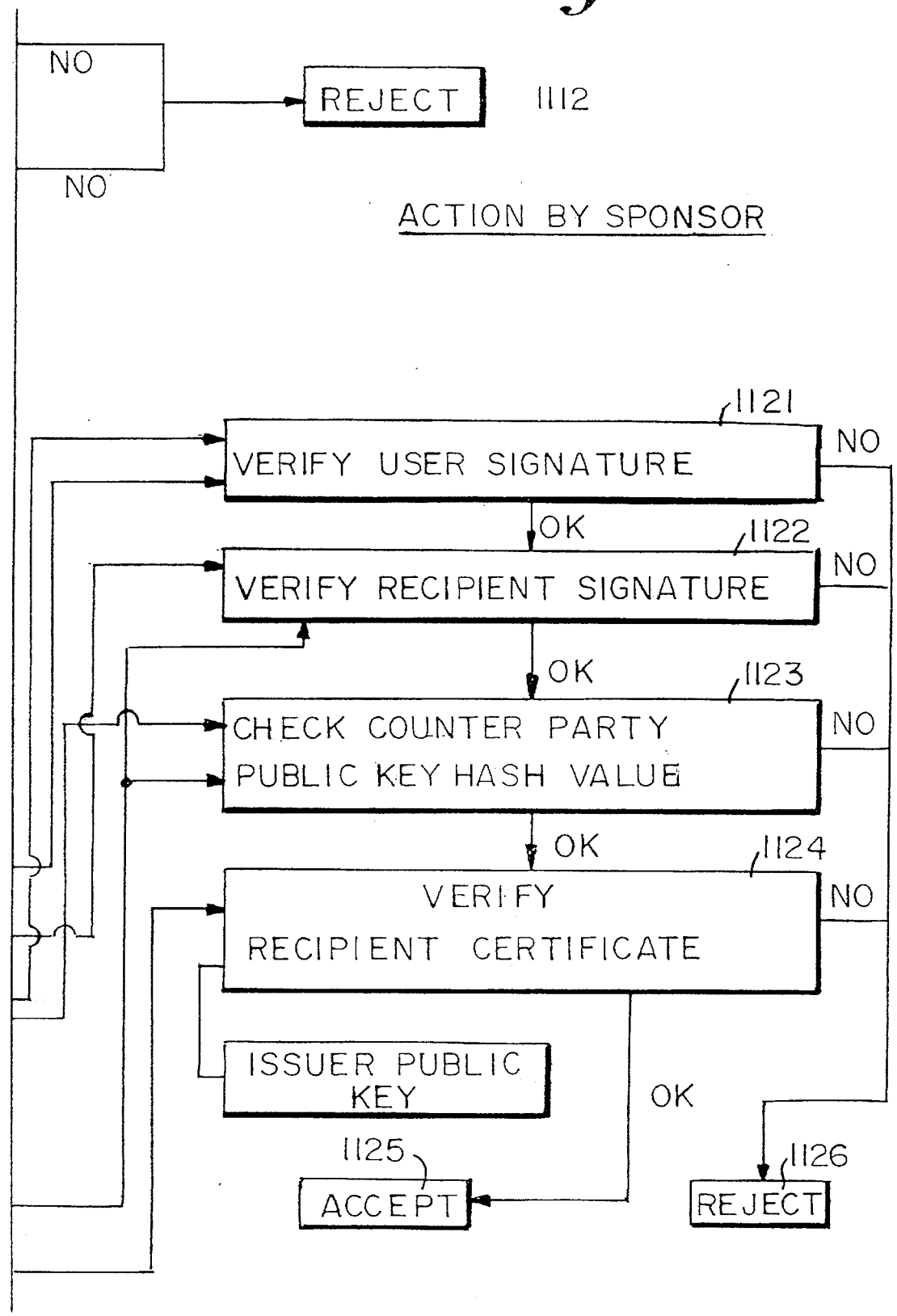

FIG. 11 shows verification by the user's sponsor of the user's transaction after receipt by a recipient. The recipient (counterparty) verifies 1110 the user's signature 1103 on the transaction 1101 and verifies 1111 the sponsor's signature 1105 on the user authorization certificate 1102. If either of these signatures does not verify, the transaction 1101 is rejected 1112. If the signatures verify and the transaction is accepted 1113 by the recipient, the recipient endorses the transaction 1101 by issuing his verified transaction 1114 counter-signing 1116 the text 1106 of the original user transaction 1101 and the sending user's signature 1103, with the recipient's certificate 1115 attached. In enforcing the preapproved counterparty restriction in the sending user's authorization certificate 1102, the sending user's sponsor verifies 1121 the sending user's signature 1103, as included in the recipient's verified transaction 1114, and verifies 1122 the recipient's signature 1116 thereon. If these signatures are verified, the sponsor next verifies 1123 the counterparty public key hash value by hashing the recipient's public key 1117 and checking the result against one of the authorized counterparty public key hash values 1104 as specified in the user's authorization certificate 1102 (the recipient's public key 1117 that the sponsor hashes for verification is itself verified 1124 when the sponsor verifies the recipient's certificate). If these conditions are met, the transaction is accepted 1125.

The attribute values of delegation controls can limit the types and value ranges of authorizations that a CA may specify when issuing an attribute certificate. They can also serve to limit the scope and depth to which a user may delegate his signing authority to others. For example, a root CA might limit an organizational CA to issuing authorizations only to allow its end users to sign documents whose document types fall into a range of documents related to state tax administration. Or a CA might grant some authority to a user with the provision that it can be delegated only to another person with the rank of assistant treasurer or higher, for a time not to exceed thirty days, and without the right to further subdelegate.

Figure 12:
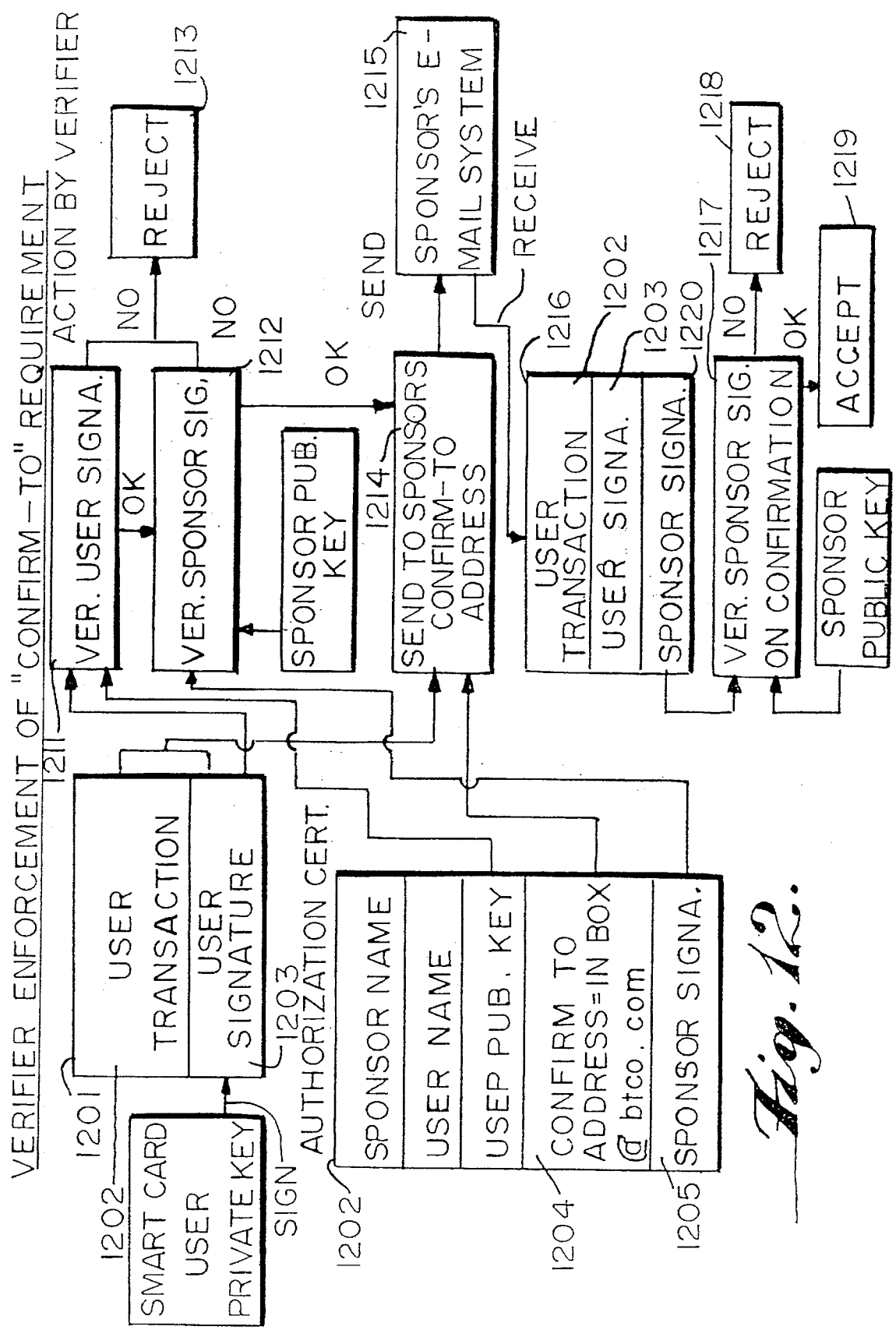
FIG. 12 is a flow chart illustrating the process of verifier enforcement of a transaction "confirm-to" requirement.

Another authorization attribute, called a "confirm-to requirement" value, prevents the signature from being valid unless the verifier sends a copy of the verified transaction to a third party, typically the user's organizational sponsor or work supervisor, at a specified mail or network address, and either (a) receives an accept/reject message, or (b) a specified time elapses. This requirement is similar to a cosignature but occurs after the transaction is sent rather than before. Such after-the-fact confirmation could be acceptable in lower risk situations in which few transactions would be rejected and in which obtaining the cosignature of the third party in advance may be unduly burdensome. As shown in FIG. 12, the recipient first, as usual, verifies 1211 the sender's signature 1203 on the transaction 1201 and verifies 1212 the sponsor's signature 1205 on the user authorization certificate 1202; if either of these signatures does not verify the transaction 1201 is rejected 1213. If the signatures are verified, the recipient sends 1214 a confirmation message consisting of the original transaction 1201 (the transaction text 1202 and the sending user's signature 1203) to the user's sponsor 1215, as specified 1204 in the sender's authorization certificate 1202. The recipient should receive from the sponsor 1215 the same message in return as confirmation 1216, but signed 1205 by the sponsor. The recipient then verifies 1217 the sponsor's signature 1220 and the confirmation message 1216, and accepts 1219 the transaction 1201.

In order to create complex combinations of restrictions, a filter expression, which is a Boolean or logical expression involving one or more attributes, can allow construction of restrictions involving multiple attributes. The attribute assertions are linked with the usual Boolean connectives: "and", "or" and "not". For example, the sponsor might restrict a user to submitting transaction with a type equal to "purchase order" and a value less than $100,000. Assertions may involve either a single attribute value (equality, less than, greater than, etc.), multiple values of an attribute (subset, superset, etc.), or the presence or absence of an attribute in the document. Of course it will be appreciated that any or any of the described restrictions, as well as others, can be in effect at the same time for the same document or transaction. These restrictions have been discussed and illustrated separately for clarity.

The use of authorization attributes allows a recipient to verify authorization as well as authentication. In such a scenario, the sponsor certificates, anchored by the sponsoring organization's certificate, would be interpreted as authorizing "on sight" the transaction to which they are applied, assuming all specified restrictions are met.

A set of basic policies must be defined for use throughout the financial services industry and other industries in order to provide a well-defined, predictable level of service for the verification process. These policies would be agreed to on a multilateral basis by every participating firm and could stipulate that certain of the restrictions and authorizations discussed in this section would always be deemed to be in effect unless expressly provided otherwise. One of the more important elements of these industry agreements would be the definition and coding of document types. This must be done on a per-industry basis, since the rules will obviously be much different, for instance, for customs inspectors, aircraft inspectors, auditors, tax officials, etc.

Certain authorization attributes may pertain to the specific content of the document itself. This can pose problems for automated machine verification, because the verifier's computer may not always be able to determine the values of such attributes for a given document or transaction. Examples include monetary transaction limits, document types, and security or confidentiality labels. Therefore, it is desirable to provide a standard data block, preferably at the start of the document or the transaction, clearly encoding the attribute, e.g. the stated monetary transaction value, document type or security sensitivity label. This document tag will be appended by the signer's computer for the convenience of the verifier and as an aid to the verification process. However, in the event of a conflict between the tag and the actual content of the document, the language of the document would be controlling. In the case of structured transactions, such as EDI transactions, in which the document types and monetary values are already completely machine readable, document tags would not be needed.

As a possible convenience in processing simple authorizations, especially where a given user signs many similar transactions, it may often be helpful to copy the user's public key out of his basic authentication certificate and include it as another attribute in an authorization certificate. This permits the authorization certificate to serve both purposes (authentication and authorization) and allows the sender to omit the basic authentication certificate from each transaction. In addition, where a device is being relied upon to fulfill a given condition, it may likewise be advantageous to copy the user's device public key into the authorization certificate as well, further eliminating the need to send the device certificate with each transaction.

Third Party Interactions

Additional, useful features of digital signatures, beyond those that can be provided using attribute certificates, involve interaction between a signer and third parties of various types.

One such use for digital signatures is electronic notarization. As discussed above, there will be a need to cosign documents using a third party that is trusted to provide an accurate timestamp and/or location information. Simply relying upon signature originators to provide this information in an accurate fashion leaves signatures vulnerable to fraud based on, for example, pre- or post-dating of documents. An electronic "notary" would be trusted by virtue of its CA's policies to provide this information correctly. The multiple signature capabilities already assumed can be expanded to provide a framework for this service.

For notarization purposes, timestamps and location information will be included as signature attributes. Individual signature structures may either be detached and stored or, if desired, conveyed separately from the document.

Multiple signatures or joint signatures on the document itself can also be distinguished from "countersignatures," which are signatures on the signature structure in which they are found and not on the document itself. A countersignature thus provides proof of the order in which signatures were applied. Because a countersignature is itself a signature structure, it may itself contain countersignatures; this allows construction of arbitrarily long chains of countersignatures. Electronic notarization would then consist of countersigning the originator's signature and including a timestamp within the information being signed. For very high-risk applications it may also be desirable to require multiple signatures on each certificate by one or more CAs, with the signatures being performed in independent cryptographic facilities and with different private keys.

Various levels of service can be defined for electronic notaries based on the level of data verification performed prior to signing (ranging from mere existence of the document, in which case notarization may be completely automatic, to human verification of document content) and based on data retention and audit capabilities.

Another use for digital signatures is for delegation or "power of attorney" certificates. Because users are often tempted to entrust their devices or smartcards to others, for example, secretaries or co-workers, when the users go on vacation, the frequent situation, in which one user obtains another user's smartcard and PIN, exposes the smartcard to possible misuse. The system therefore facilitates the issuance of power of attorney certificates that allow a delegate to associate the signature of his own smartcard with the authority of the delegating user. The power of attorney certificate would include at a minimum the name of the delegator, identification of the delegate's public key certificate and a short validity period, and would be signed by the delegator. Another possibility is for the delegate to create a new key pair exclusively for use with the delegator's signature, with the new public key included in the power of attorney certificate. This would eliminate any potential confusion between use of the delegate's private key on behalf of the delegator and on his own behalf.

The problem of handing over smart cards can be greatly reduced by providing a workable alternative that preserves the principle of individual accountability. Wide implementation of this feature will make practical the disallowance of smartcard loans, a highly desirable goal.

The use of delegation certificates discussed above implies that the user is acting as a CA. In some cases, particularly those in which the transaction crosses organizational boundaries, there may be concern that the level of controls and auditing available with the individual user's cryptographic device (e.g., a smart card) is not sufficient. In such cases, delegation certificates could be issued by a CA upon request of the delegator as normal authorization certificates. This also allows the delegation certificates to be revoked using the standard CRL mechanism. Users' certificates might then indicate a list of possible delegates, and the delegation certificate itself would contain an attribute naming the delegator.

In exercising the power of attorney, a user may indicate that he is signing for another user by including in the document or transaction a "signing-for" signature attribute, i.e., the name of the user being signed for. There must be a valid delegation certificate authorizing the signer to act for the user being signed for. Delegation is also useful in connection with a cryptographic module in a user's personal computer. Hashing and signing a document should ideally be a unitary operation in order to prevent substitution of a false hash via software hacking. However, the typical smartcard lacks the computing power to hash a very long document. One solution is to let the smartcard delegate this function to the cryptographic module using a very short-lived delegation certificate valid for only a few minutes. This certificate is signed by the user's smart card and indicates that the user of the smart card has allowed the delegation. See, for example: Gasser, M., A. Goldstein, C. Kaufman and B. Lampson, "The Digital Distributed System Security Architecture," Proceedings of the 12th National Computer Security Conference, 1989; Gasser, M. and E. McDermott, "An Architecture for Practical Delegation in a Distributed System," Proceedings of the 1990 IEEE Symposium on Security and Privacy.

A more basic problem, however, is ensuring that all possible recipients will actually employ the certificate- and attribute-verification methods described above. Although these methods allow sponsoring organizations to protect themselves, their users and those with whom they transact from liability based upon falsified transactions by allowing them to verify the identity and qualifications of those with whom they transact and the characteristics of the transactions prior to transacting, there is no guarantee that all recipients will actually so verify. If a recipient acts upon a transaction without first verifying the attributes of both the sender and the transaction, and if the sender is later found to have sent a fraudulent or unauthorized transaction, the recipient could then claim liability from the sender or its sponsor by claiming that the recipient was unaware of any requirement for authorization verification of the user's basic signature. One way to ensure that sponsors and other entities are protected from liability in such a situation is to prevent the root key, the public key of the ultimate authority, i.e., the highest-level certifying authority, which key would-be verifiers will need in order to verify any part of a transaction, from being distributed to a user (or to the user's device or smartcard) unless the user contracts with the cryptographic system and agrees to verify all parties and all transactions in accordance with the preestablished rules. In this way, the users are not technically forced to verify all parts of their transactions. However, not verifying their transactions in full would violate the contract between the users and the cryptographic system and would thereby absolve all other parties to the cryptographic system, e.g. a sponsor whose employee acted without authority, from liability. The non-verifying recipient would then bear all the risks of such an unverified transaction himself. Furthermore, because the root key of the system authority is considered a trade secret, no one who has not signed the system rules agreement may possess a copy of it, and no one could claim to have verified any part of the transaction. This art of keeping the system root key as a trade secret lends particular force and effectiveness to all the restriction and authorization methods described herein. It is believed that the possibility of incurring the potentially-large liability for valuable transactions will persuade users to employ the methods of attribute verification of this invention.

Restrictions on Certificate Distribution

Users and organizations must be able to restrict the distribution of all types of certificates for a number of reasons. First, the certificates often contain confidential business information that the user or organization prefers not be shared with others and that is nevertheless being shared with the verifier through the certificate, albeit only for the limited purpose of signature verification. Also, users' basic privacy rights may be violated if their public keys and network addresses are published. For example, they may be flooded with unsolicited business proposals and advertisements once their public keys are disseminated. Furthermore, the organization may have a general policy against giving out user identification numbers and public keys, because they may be used as starting points for various types of security attacks.

This functionality may be implemented in the user's attribute certificate. If the "distribution-restriction" attribute is TRUE, the user/issuer grants permission to use the certificate and its associated public key certificate only for signature verification; distribution or further publication is prohibited. Other ways to specify this restriction might include placing the attribute in the organization's certificate, publishing the restriction as part of the industry-specific policy, or (in a true X.500 implementation) using the X.500 access control list mechanism to restrict casual access to the certificate. Although some existing general legal basis for enforcing this restriction might be found under copyright law, i.e., if the certificate is declared as an unpublished work for which a license is granted only to the named verifier, a firmer legal basis will still be desirable.

Smartcard Requirements

There are some additional requirements on smartcards when used with commercial digital signature systems.

The first requirement is private key confinement and self-certification. That is, the user's private signature key must never be allowed to leave the smart card. Only in this way can it be assured that theft of the key cannot be accomplished through purely electronic means without leaving any evidence. This principle of private key confinement is vital to the concept of non-repudiation.

Figure 13:
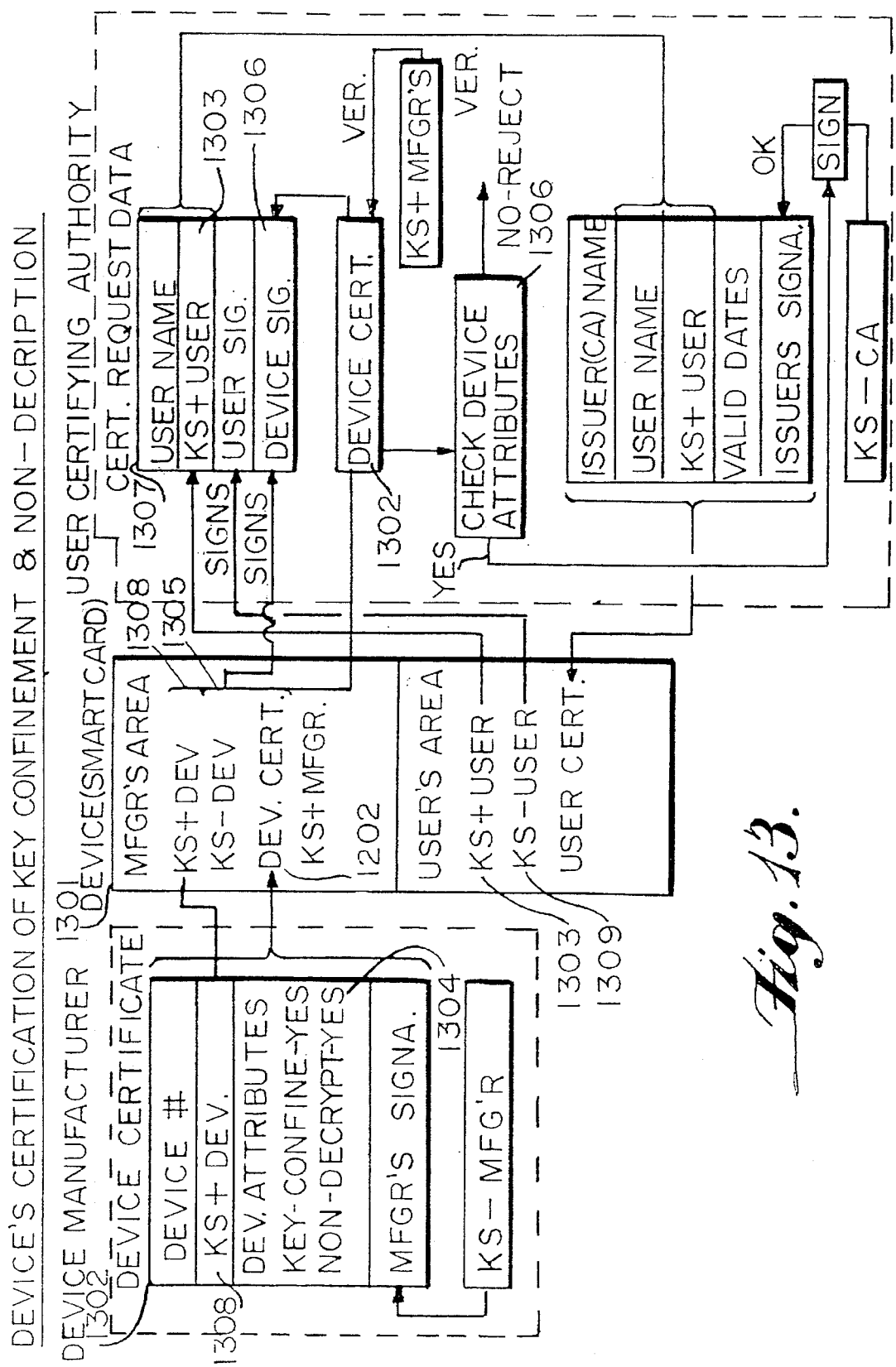
FIG. 13 is a flow chart illustrating the process of a device's certification of key confinement and nondecryption.

Thus, as illustrated in FIG. 13, when providing a public key 1303 to be certified, the card 1301 must attest that the card 1301 is tamperproof and possesses a key confining design. Proof can be provided via a "device certificate" 1302 stating that the card originates from the specific manufacturer or product line. The public key 1308 of the device 1301 must then be certified by the manufacturer or by a CA designated by the manufacturer. One likely approach to creating this device certificate would be to generate the device key pair during fabrication of the smartcard so that the corresponding device certificate 1302 could also be included on the card. The device certificate 1302 certifies the properties 1304 of the card, and the card generates a key pair 1303,1309 which is to be used by the user of the card and which the user can have certified as his own by any appropriate desired CA. Then, when submitting a newly generated public key 1303 for certification, the device private signature key 1305 would be used to countersign 1306 the certificate request data 1307, which is already signed by the newly-generated user private key 1309.

Also, in a case in which the government requires that all decryption keys be escrowed, the card should be able to certify that it is incapable of decryption. This "signature only" certification can be implemented through the same mechanisms described above, thus allowing the user's signature key to remain exempt from escrow requirements. Because it is doubtful whether an escrowed key retains any value for non-repudiation services, this certification is vital in order to prevent the signature key's disclosure through possible mishandling during an escrow process.

Smartcards should also be required to guard against unauthorized use of personal identification numbers (PINs). Normally, a smartcard is protected against unauthorized use by a PIN, the equivalent of a password. Typically, a PIN is changeable only by the user and must be a specified length, but typically nothing prevents the user from setting the PIN to a trivial number, e.g. all 1's or 121212. Smartcard vendors should be requested to implement PIN-change routines that insure non-trivial PINs without repeating digits or obvious patterns. Making the PIN relatively long (at least 6 digits) and non-trivial reduces the chance that the card can be operated by someone finding or stealing it. Support for a 6-digit PIN requirement can be found in ANSI, "X9.26: Financial Institution Sign-On Authentication for Wholesale Financial Transactions", 1990, which is hereby incorporated by reference and which sets forth the "one-in-a-million" standard that states that a log-in mechanism may be considered secure if, among other things, an attacker has no more than a one-in-a-million chance of guessing the correct password and if the system takes evasive action to prevent repeated guessing. Furthermore, smartcards should be required to take "evasive action", e.g., shutting down for a period of time or even erasing private keys, if too many incorrect PINs are entered by an attempted user.

It could also be made a requirement that smartcard manufacturers use biometrics as more secure methods of identification. Extensive work is currently being done in the areas of voiceprint and fingerprint identification, as a supplement to PINs. However, while the rates of false positive and negative still must be reduced, the main problem lies in securing the biometric input device and its data channel so that they are immune to capture and replay of the biometric data. This is not a problem when the biometric device is embedded in a concrete wall, for example in an ATM or door access system, but it remains a serious problem in typical commercial office settings. Ideally, the card and biometric input device will each be tamperproof cryptographic modules that can certify themselves and establish secure channels with each other.

Smartcards should also be able to maintain an "audit trail," or an internal log of recent actions, containing at a minimum, a timestamp, transaction amount, type code and message digest. This information can be compressed into 40 or so bytes so that a 400-record circular log would consume around 16K bytes. This log would be uploaded and checked only on receipt of a signed request from the card issuer over a secure channel. Also, the card would not delete the old log until it received a signed confirmation from the issuer stating that the uploaded log had been received intact. This control mechanism will deter forgery, reduce the damage that can be caused by a forger, and allow unauthorized or questioned transactions to be investigated more quickly and easily. Since most or all transactions occur off-line from the issuer, the card is the best witness of its own actions.

Thus, a method for securely using digital signatures in a commercial cryptographic system is provided. One skilled in the art will appreciate that the present invention can be practiced by other that the described embodiments, which are presented for purposes of illustration and not limitation, and the present invention is limited only by the claims that follow.

I claim:

1. A method of enforcing a policy in a cryptographic communication system comprising the steps of:

receiving a digital user transaction including a digital message and attribute data, and a digital user signature based on said digital message and on a private key of a user;

receiving a digital identifying certificate issued by a certifying authority and having a plurality of digital fields, at least one of said fields identifying said user;

receiving a digital authorizing certificate, separate from said identifying certificate and issued by a sponsor of said user, and authorizing transactions by said user, said authorizing certificate containing rules specifying conditions under which said digital transaction is valid, said rules to be applied to said attribute data;

verifying said transaction based on information in said identifying certificate and in said authorizing certificate, said step of verifying including applying said rules to said attribute data in order to verify that said transaction is valid; and accepting said transaction based on said outcome of said verifying, wherein said attribute data includes a timestamp indicating when said transaction was formed and wherein said rules specify allowed times at which transactions can be formed and wherein said step of verifying includes a step of determining whether said timestamp indicates one of said specified allowed times, and wherein said allowed times are certain days of the week, and wherein said step of verifying includes a step of determining whether said timestamp indicates that said transaction was formed on one of said certain days of the week.

2. A method of enforcing a policy in a cryptographic communication system comprising the steps of:

receiving a digital user transaction including a digital message and attribute data, and a digital user signature based on said digital message and on a private key of a user;

receiving a digital identifying certificate issued by a certifying authority and having a plurality of digital fields, at least one of said fields identifying said user;

receiving a digital authorizing certificate, separate from said identifying certificate and issued by a sponsor of said user, and authorizing transactions by said user, said authorizing certificate containing rules specifying conditions under which said digital transaction is valid, said rules to be applied to said attribute data;

verifying said transaction based on information in said identifying certificate and in said authorizing certificate, said step of verifying including applying said rules to said attribute data in order to verify that said transaction is valid; and accepting said transaction based on said outcome of said verifying, wherein said attribute data includes a timestamp indicating when said transaction was formed and wherein said rules specify allowed times at which transactions can be formed and wherein said step of verifying includes a step of determining whether said timestamp indicates one of said specified allowed times, and wherein said allowed times are certain times of day, and wherein said step of verifying includes a step of determining whether said timestamp indicates that said transaction was formed at said certain times of day.

3. A method of enforcing a policy in a cryptographic communication system comprising the steps of:

receiving a digital user transaction including a digital message and attribute data, and a digital user signature based on said digital message and on a private key of a user;

receiving a digital identifying certificate issued by a certifying authority and having a plurality of digital fields, at least one of said fields identifying said user;

receiving a digital authorizing certificate, separate from said identifying certificate and issued by a sponsor of said user, and authorizing transactions by said user, said authorizing certificate containing rules specifying conditions under which said digital transaction is valid, said rules to be applied to said attribute data;

verifying said transaction based on information in said identifying certificate and in said authorizing certificate, said step of verifying including applying said rules to said attribute data in order to verify that said transaction is valid; and accepting said transaction based on said outcome of said verifying, wherein said attribute data includes a timestamp indicating when said transaction was formed and wherein said rules specify a time period after said transaction was formed within which said user signature is valid, and wherein said transaction is invalid if said signature is not verified within said specified time period, and wherein said step of verifying said transaction comprises the steps of:

verifying said signature and determining whether said verifying of said signature took place within said specified time period.

4. A method A method of enforcing a policy in a cryptographic communication system comprising the steps of:

receiving a digital user transaction including a digital message and attribute data, and a digital user signature based on said digital message and on a private key of a user;

receiving a digital identifying certificate issued by a certifying authority and having a plurality of digital fields, at least one of said fields identifying said user;

receiving a digital authorizing certificate, separate from said identifying certificate and issued by a sponsor of said user, and authorizing transactions by said user, said authorizing certificate containing rules specifying conditions under which said digital transaction is valid, said rules to be applied to said attribute data;

verifying said transaction based on information in said identifying certificate and in said authorizing certificate, said step of verifying including applying said rules to said attribute data in order to verify that said transaction is valid; and accepting said transaction based on said outcome of said verifying, wherein said attribute data includes a role said user is exercising by performing said transaction and wherein said rules specify roles which said user may exercise, and wherein said step of verifying includes a step of determining whether said role is one of said specified roles.

5. A method A method of enforcing a policy in a cryptographic communication system comprising the steps of:

receiving a digital user transaction including a digital message and attribute data, and a digital user signature based on said digital message and on a private key of a user;

receiving a digital identifying certificate issued by a certifying authority and having a plurality of digital fields, at least one of said fields identifying said user;

receiving a digital authorizing certificate, separate from said identifying certificate and issued by a sponsor of said user, and authorizing transactions by said user, said authorizing certificate containing rules specifying conditions under which said digital transaction is valid, said rules to be applied to said attribute data, wherein said rules specify a list of at least one recipient of said transaction considered acceptable by said sponsor;

verifying said transaction based on information in said identifying certificate and in said authorizing certificate, said step of verifying including applying said rules to said attribute data in order to verify that said transaction is valid, said step of verifying by a recipient including the step of determining whether said recipient is in said list; and accepting said transaction based on said outcome of said verifying, said method further comprising the steps of, after said step of verifying:

forming a digital recipient signature based on said user transaction and on a private key of said recipient;

combining said digital recipient signature and said user transaction to form a verified transaction;

providing to said sponsor said verified transaction.

6. A method of enforcing a policy in a cryptographic communication system comprising the steps of:

receiving a digital user transaction including a digital message and attribute data, and a digital user signature based on said digital message and on a private key of a user;

receiving a digital identifying certificate issued by a certifying authority and having a plurality of digital fields, at least one of said fields identifying said user;

receiving a digital authorizing certificate, separate from said identifying certificate and issued by a sponsor of said user, and authorizing transactions by said user, said authorizing certificate containing rules specifying conditions under which said digital transaction is valid, said rules specifying that said sponsor must be notified of and must approve said transaction, said rules to be applied to said attribute data;

verifying said transaction based on information in said identifying certificate and in said authorizing certificate, said step of verifying including applying said rules to said attribute data in order to verify that said transaction is valid;

accepting said transaction based on said outcome of said verifying;

notifying said sponsor of said transaction; and awaiting a reply from said sponsor.

7. A method as in claim 6, wherein said step of notifying includes the steps of:

sending said user transaction to said sponsor, and wherein said sponsor indicates approval of said transaction by returning to said recipient a confirmation transaction formed by said sponsor digitally signing said sent user transaction; and wherein said step of verifying further comprises the steps of:

receiving from said sponsor a reply and determining whether said reply is a confirmation transaction signed by said sponsor.

8. A method of enforcing a policy in a cryptographic communication system comprising the steps of:

forming a digital message by a user;

forming a digital user signature based on said digital message and a private key of said user;

combining said digital message and said digital user signature to form a digital user transaction, said digital transaction containing attribute data including a timestamp indicating when said transaction was formed;

combining with said digital user transaction a digital identifying certificate issued by a certifying authority, said identifying certificate having a plurality of digital fields, at least one of said fields identifying said user; and combining with said digital transaction a digital authorizing certificate, separate from said identifying certificate and issued by a sponsor of said user, for authorizing transactions by said user, wherein said digital authorizing certificate contains rules specifying conditions under which said digital transaction is valid, said rules to be applied to said attribute data in order to determine whether said transaction is valid, wherein said rules specify allowed times at which transactions can be formed, and wherein said transaction is invalid if said timestamp does not indicate one of said specified allowed times, and wherein said allowed times are certain days of the week, and wherein said transaction is invalid if said timestamp indicates that said transaction was not formed on one of said certain days of the week.

9. A method of enforcing a policy in a cryptographic communication system comprising the steps of:

forming a digital message by a user;

forming a digital user signature based on said digital message and a private key of said user;

combining said digital message and said digital user signature to form a digital user transaction, said digital transaction containing attribute data including a timestamp indicating when said transaction was formed;

combining with said digital user transaction a digital identifying certificate issued by a certifying authority, said identifying certificate having a plurality of digital fields, at least one of said fields identifying said user; and combining with said digital transaction a digital authorizing certificate, separate from said identifying certificate and issued by a sponsor of said user, for authorizing transactions by said user, wherein said digital authorizing certificate contains rules specifying conditions under which said digital transaction is valid, said rules to be applied to said attribute data in order to determine whether said transaction is valid, wherein said rules specify allowed times at which transactions can be formed, and wherein said transaction is invalid if said timestamp does not indicate one of said specified allowed times, and wherein said allowed times are certain times of day and wherein said transaction is invalid if said timestamp indicates that said transaction was not formed at said certain times of day.

10. A method of enforcing a policy in a cryptographic communication system comprising the steps of:

forming a digital message by a user;

forming a digital user signature based on said digital message and a private key of said user;

combining said digital message and said digital user signature to form a digital user transaction, said digital transaction containing attribute data;

combining with said digital user transaction a digital identifying certificate issued by a certifying authority, said identifying certificate having a plurality of digital fields, at least one of said fields identifying said user; and combining with said digital transaction a digital authorizing certificate, separate from said identifying certificate and issued by a sponsor of said user, for authorizing transactions by said user, wherein said digital authorizing certificate contains rules specifying conditions under which said digital transaction is valid, said rules to be applied to said attribute data in order to determine whether said transaction is valid, wherein said attribute data includes a role said user is exercising by performing said transaction and wherein said rules specify roles which said user may exercise and wherein said transaction is invalid if said role is not one of said specified roles.

11. A method of enforcing a policy in a cryptographic communication system comprising the steps of:

forming a digital message by a user;

forming a digital user signature based on said digital message and a private key of said user;

combining said digital message and said digital user signature to form a digital user transaction, said digital transaction containing attribute data;

combining with said digital user transaction a digital identifying certificate issued by a certifying authority, said identifying certificate having a plurality of digital fields, at least one of said fields identifying said user; and combining with said digital transaction a digital authorizing certificate, separate from said identifying certificate and issued by a sponsor of said user, for authorizing transactions by said user, wherein said digital authorizing certificate contains rules specifying conditions under which said digital transaction is valid, said rules to be applied to said attribute data in order to determine whether said transaction is valid, wherein said rules specify that said sponsor must be notified of and must approve said transaction and wherein said transaction is invalid unless said sponsor is notified of said transaction.

12. A method of enforcing a policy in a cryptographic communication system comprising:

forming a digital message by a user;

forming a digital user signature based on said digital message and a private key of said user;

combining said digital message and said digital user signature to form a digital user transaction;

combining with said digital user transaction a digital identifying certificate issued by a certifying authority, said identifying certificate having a plurality of digital fields, at least one of said fields identifying said user; and combining with said digital transaction a digital authorizing certificate, separate from said identifying certificate and issued by a sponsor of said user, for authorizing transactions by said user, wherein said digital authorizing certificate contains rules identifying conditions under which said digital transaction is valid, said rules to be applied to said digital message in order to determine whether said transaction is valid.

13. A method of enforcing a policy in a cryptographic communication system comprising the steps of:

forming a digital message by a user;

forming a digital user signature based on said digital message and a private key of said user;

combining said digital message and said digital user signature to form a digital user transaction, wherein said transaction contains attribute data including a document type of said message;

combining with said digital user transaction a digital certificate issued by a certifying authority, said certificate having a plurality of digital fields, at least one of said fields identifying said user and at least one other of said fields containing a rule specifying a condition under which said digital transaction is valid according to said certifying authority, said rule to be applied to said attribute data in order to determine whether said transaction is valid, and wherein said rule specifies allowed document types for messages, and wherein said transaction is invalid if said document type is not one of said specified allowed document types.

14. A method of enforcing a policy in a cryptographic communication system comprising the steps of:

receiving a digital user transaction including a digital message and a digital user signature based on said digital message and on a private key of a user, wherein said transaction contains attribute data including a document type of said message;

receiving a digital certificate issued by a certifying authority and having a plurality of digital fields, at least one of said fields identifying said user and at least one other of said fields containing a rule specifying a condition under which said digital transaction is valid according to said certifying authority, said rule to be applied to said attribute data in order to determine whether said transaction is valid, and wherein said rule specifies allowed document types for messages;

verifying said transaction based on information in said certificate, including determining whether said document type is one of said specified allowed document types; and accepting said transaction based on said outcome of said verifying.

15. A method of enforcing a policy in a cryptographic communication system comprising the steps of:

forming a digital message by a user;

forming a digital user signature based on said digital message and a private key of said user;

combining said digital message and said digital user signature to form a digital user transaction, wherein said transaction contains attribute data including a location at which said transaction was formed;

combining with said digital user transaction a digital certificate issued by a certifying authority, said certificate having a plurality of digital fields, at least one of said fields identifying said user and at least one other of said fields containing a rule specifying a condition under which said digital transaction is valid according to said certifying authority, said rule to be applied to said attribute data in order to determine whether said transaction is valid, and wherein said rule specifies allowed locations at which transactions may be formed, and wherein said transaction is invalid if said location is not one of said specified allowed locations.

16. A method of enforcing a policy in a cryptographic communication system comprising the steps of:

receiving a digital user transaction including a digital message and a digital user signature based on said digital message and on a private key of a user, wherein said transaction contains attribute data including a location at which said transaction was formed;

receiving a digital certificate issued by a certifying authority and having a plurality of digital fields, at least one of said fields identifying said user and at least one other of said fields containing a rule specifying a condition under which said digital transaction is valid according to said certifying authority, and wherein said rule specifies allowed locations at which transactions may be formed;

verifying said transaction based on information in said certificate, including determining whether said location is one of said specified allowed locations; and accepting said transaction based on said outcome of said verifying.

17. A method of enforcing a policy in a cryptographic communication system comprising the steps of:

forming a digital message by a user;

forming a digital user signature based on said digital message and a private key of said user;

combining said digital message and said digital user signature to form a digital user transaction, wherein said transaction contains attribute data including a timestamp indicating when said transaction was formed;

combining with said digital user transaction a digital certificate issued by a certifying authority, said certificate having a plurality of digital fields, at least one of said fields identifying said user and at least one other of said fields containing a rule specifying a condition under which said digital transaction is valid according to said certifying authority, said rule to be applied to said attribute data in order to determine whether said transaction is valid, and wherein said rule specifies allowed times at which transactions may be formed, and wherein said transaction is invalid if said timestamp does not indicate one of said specified allowed times.

18. A method as in claim 17, wherein said allowed times are certain days of the week, and wherein said transaction is invalid if said timestamp indicates that said transaction was not formed on one of said certain days of the week.

19. A method as in claim 17, wherein said allowed times are certain times of day and wherein said transaction is invalid if said timestamp indicates that said transaction was not formed at said certain times of day.

20. A method of enforcing a policy in a cryptographic communication system comprising the steps of:

receiving a digital user transaction including a digital message and a digital user signature based on said digital message and on a private key of a user, wherein said transaction contains attribute data including a timestamp indicating when said transaction was formed;

receiving a digital certificate issued by a certifying authority and having a plurality of digital fields, at least one of said fields identifying said user and at least one other of said fields containing a rule specifying a condition under which said digital transaction is valid according to said certifying authority, and wherein said rule specifies allowed times at which transactions may be formed;

verifying said transaction based on information in said certificate, including determining whether said timestamp indicates one of said specified allowed times; and accepting said transaction based on said outcome of said verifying.

21. A method as in claim 20, wherein said allowed times are certain days of the week, and wherein said step of verifying includes a step of determining whether said timestamp indicates that said transaction was formed on one of said certain days of the week.

22. A method as in claim 20, wherein said allowed times are certain times of day, and wherein said step of verifying includes a step of determining whether said timestamp indicates that said transaction was formed at said certain times of day.

23. A method of enforcing a policy in a cryptographic communication system comprising the steps of:

forming a digital message by a user;

forming a digital user signature based on said digital message and a private key of said user;

combining said digital message and said digital user signature to form a digital user transaction, wherein said transaction contains attribute data including a timestamp indicating when said transaction was formed;

combining with said digital user transaction a digital certificate issued by a certifying authority, said certificate having a plurality of digital fields, at least one of said fields identifying said user and at least one other of said fields containing a rule specifying a condition under which said digital transaction is valid according to said certifying authority, said rule to be applied to said attribute data in order to determine whether said transaction is valid, and wherein said rule specifies a time period within which said signature is valid, and wherein said transaction is invalid if said signature is not verified within said specified time period.

24. A method as in claim 23, wherein said specified time period specifies a maximum allowable age of said user signature, and wherein said transaction is invalid if said user signature is not verified before said user signature reaches said maximum allowable age.

25. A method of enforcing a policy in a cryptographic communication system comprising the steps of:

receiving a digital user transaction including a digital message and a digital user signature based on said digital message and on a private key of a user, wherein said transaction contains attribute data including a timestamp indicating when said transaction was formed;

receiving a digital certificate issued by a certifying authority and having a plurality of digital fields, at least one of said fields identifying said user and at least one other of said fields containing a rule specifying a condition under which said digital transaction is valid according to said certifying authority, and wherein said rule specifies a time period within which said signature is valid;

verifying said transaction based on information in said certificate; and accepting said transaction based on said outcome of said verifying, wherein said step of verifying includes the steps of:
 verifying said signature; and
 determining whether said verifying of said signature took place within said specified time period.

26. A method as in claim 25, wherein said specified time period specifies a maximum allowable age of said user signature, and wherein said transaction is invalid if said user signature is not verified before said user signature reaches said maximum allowable age.

27. A method of enforcing a policy in a cryptographic communication system comprising the steps of:

forming a digital message by a user;

forming a digital user signature based on said digital message and a private key of said user;

combining said digital message and said digital user signature to form a digital user transaction, wherein said transaction contains attribute data including a role said user is exercising by performing said transaction;

combining with said digital user transaction a digital certificate issued by a certifying authority, said certificate having a plurality of digital fields, at least one of said fields identifying said user and at least one other of said fields containing a rule specifying a condition under which said digital transaction is valid according to said certifying authority, said rule to be applied to said attribute data in order to determine whether said transaction is valid, and wherein said rule specifies allowed roles which said user may exercise, and wherein said transaction is invalid if said role is not one of said specified allowed roles.

28. A method of enforcing a policy in a cryptographic communication system comprising the steps of:

receiving a digital user transaction including a digital message and a digital user signature based on said digital message and on a private key of a user, wherein said transaction contains attribute data including a role said user is exercising by performing said transaction;

receiving a digital certificate issued by a certifying authority and having a plurality of digital fields, at least one of said fields identifying said user and at least one other of said fields containing a rule specifying a condition under which said digital transaction is valid according to said certifying authority, and wherein said rule specifies allowed roles which said user may exercise;

verifying said transaction based on information in said certificate, including determining whether said role is one of said specified allowed roles; and accepting said transaction based on said outcome of said verifying.

29. A method of enforcing a policy in a cryptographic communication system comprising the steps of:

forming a digital message by a user;

forming a digital user signature based on said digital message and a private key of said user;

combining said digital message and said digital user signature to form a digital user transaction;

combining with said digital user transaction a digital certificate issued by a certifying authority, said certificate having a plurality of digital fields, at least one of said fields identifying said user and at least one other of said fields containing a rule specifying a condition under which said digital transaction is valid according to said certifying authority, said rule to be applied to said attribute data in order to determine whether said transaction is valid, and wherein said rule specifies that a specified entity must be notified of said transaction and wherein said transaction is invalid unless said specified entity is notified of and approves said transaction.

30. A method of enforcing a policy in a cryptographic communication system comprising the steps of:

receiving a digital user transaction including a digital message and a digital user signature based on said digital message and on a private key of a user;

receiving a digital certificate issued by a certifying authority and having a plurality of digital fields, at least one of said fields identifying said user and at least one other of said fields containing a rule specifying a condition under which said digital transaction is valid according to said certifying authority, and wherein said rule specifies that a specified entity must be notified of said transaction;

verifying said transaction based on information in said certificate;

accepting said transaction based on said outcome of said verifying;

notifying said specified entity of said transaction; and awaiting a reply from said specified entity.

31. A method as in claim 30, wherein said step of notifying includes the step of:

sending said user transaction to said specified entity, and wherein said specified entity indicates approval of said transaction by returning to said recipient a confirmation transaction formed by said specified entity digitally signing said sent user transaction; and wherein said step of verifying further comprises the steps of:

receiving from said specified entity a reply and determining whether said reply is a confirmation transaction signed by said specified entity.

32. A method of enforcing a policy in a cryptographic communication system comprising the steps of:

forming a digital message by a user;

forming a digital user signature based on said digital message and a private key of said user;

combining said digital message and said digital user signature to form a digital user transaction;

combining with said digital user transaction a digital certificate issued by a certifying authority, said certificate having a plurality of digital fields, at least one of said fields identifying said user and at least one other of said fields containing a rule specifying a condition under which said digital transaction is valid according to said certifying authority, said rule to be applied to said attribute data in order to determine whether said transaction is valid, and wherein said rule specifies a list of at least one recipient of said transaction considered acceptable by said certifying authority and wherein said transaction is invalid if it is acted on by a recipient not in said list.

33. A method as in claim 31, wherein said transaction is invalid unless said certifying authority determines that said recipient is in said list.

34. A method of enforcing a policy in a cryptographic communication system comprising the steps of:

receiving a digital user transaction including a digital message and a digital user signature based on said digital message and on a private key of a user;

receiving a digital certificate issued by a certifying authority and having a plurality of digital fields, at least one of said fields identifying said user and at least one other of said fields containing a rule specifying a condition under which said digital transaction is valid according to said certifying authority, and wherein said rule specifies a list of at least one recipient of said transaction considered acceptable by said certifying authority;

verifying said transaction based on information in said certificate, including determining whether a recipient is in said list, and accepting said transaction based on said outcome of said verifying.

35. A method as in claim 34, wherein said transaction is invalid unless said certifying authority determines that said recipient is in said list, said method further comprising the steps of, after said step of verifying:

forming a digital recipient signature based on said user transaction and on a private key of said recipient;

combining said digital recipient signature and said user transaction to form a verified transaction;

providing to said certifying authority said verified transaction.

36. A method as in claim 11, wherein said transaction is invalid unless, upon notification of said transaction, said sponsor approves said transaction.

37. A method of enforcing a policy in a cryptographic communication system comprising the steps of:

receiving a digital user transaction including a digital message and a digital user signature based on said digital message and on a private key of a user, wherein said transaction contains attribute data including a timestamp indicating when said transaction was formed;

receiving a digital certificate issued by a certifying authority and having a plurality of digital fields, at least one of said fields identifying said user and at least one other of said fields containing a rule specifying a condition under which said digital transaction is valid according to said certifying authority, and wherein said rule specifies a time period after said transaction was formed within which said user signature is valid, and wherein said transaction is invalid if said signature is not verified within said specified time period, verifying said transaction based on information in said certificate; and accepting said transaction based on said outcome of said verifying, wherein said step of verifying includes the steps of:
  verifying said signature; and
  determining whether said verifying of said signature took place after said specified time period.

* * * * *